United States Patent
Ogasawara

(10) Patent No.: US 9,539,660 B2
(45) Date of Patent: Jan. 10, 2017

(54) TOOL FOR CUTTING GEAR AND METHOD FOR CUTTING GEAR

(71) Applicant: Hiroomi Ogasawara, Yamakita-machi (JP)

(72) Inventor: Hiroomi Ogasawara, Yamakita-machi (JP)

(73) Assignee: Ogasawara Precision Engineering Ltd., Kanagawa-Ken (JP)

( * ) Notice: Subject to any disclaimer, the term of this patent is extended or adjusted under 35 U.S.C. 154(b) by 968 days.

(21) Appl. No.: 13/665,606

(22) Filed: Oct. 31, 2012

(65) Prior Publication Data

US 2013/0309026 A1 Nov. 21, 2013

(30) Foreign Application Priority Data

May 16, 2012 (JP) .................. 2012-112867

(51) Int. Cl.
*B23F 21/00* (2006.01)
*B23F 21/16* (2006.01)
(Continued)

(52) U.S. Cl.
CPC ............ *B23F 21/166* (2013.01); *B23F 9/082* (2013.01); *B23F 15/06* (2013.01); *B23F 21/122* (2013.01);
(Continued)

(58) Field of Classification Search
CPC ......... B23F 21/122; B23F 21/16; B23F 15/06; B23F 9/00
See application file for complete search history.

(56) References Cited

U.S. PATENT DOCUMENTS 1,809,869 A 6/1931 Simmons
1,815,685 A * 7/1931 Trbojevich .............. F16H 55/22
74/458

(Continued)

FOREIGN PATENT DOCUMENTS

DE 2654177 A1 6/1978
DE 10 2009 003601 A1 9/2010

OTHER PUBLICATIONS

Extended Search Report from European Patent Application No. 12191519.3 dated Jun. 13, 2016.

*Primary Examiner* — Will Fridie, Jr.
(74) *Attorney, Agent, or Firm* — Ladas & Parry, LLP

(57) ABSTRACT

There is provided a tool for efficiently cutting a face gear to be meshed with a helical gear. When a circular tooth thickness of a tooth tip of a cutting edge portion is represented as $S_{atSC}$, a circular tooth thickness on a virtual outside diameter of a tooth profile of the helical gear in a cross-sectional view perpendicular to an axis is represented as $S_{at}$, a helix angle on the virtual outside diameter of the tooth profile of the helical gear in a cross-sectional view by a plane perpendicular to the axis is represented as $\beta_a$, and a face width of the cutting edge portion is represented as $b_{sc}$, $$b_{SC} \leq \frac{S_{at} - S_{atSC}}{\tan\beta_a}$$

is satisfied.

13 Claims, 26 Drawing Sheets

(51) Int. Cl.
    *B23F 21/12*    (2006.01)
    *B23F 15/06*    (2006.01)
    *B23F 9/08*     (2006.01)
    *B23F 21/10*        (2006.01)

(52) U.S. Cl.
    CPC ............ *B23F 21/16* (2013.01); *Y10T 407/173* (2015.01); *Y10T 409/101749* (2015.01)

(56) References Cited

U.S. PATENT DOCUMENTS

| | | | | |
|---|---|---|---|---|
| 1,913,865 A | * | 6/1933 | Wildhaber | B23F 5/16 407/28 |
| 2,228,966 A | * | 1/1941 | Miller | B23F 21/284 407/20 |
| 2,295,148 A | * | 9/1942 | Witham | B23F 19/06 407/27 |
| 2,308,891 A | * | 1/1943 | Miller | B23F 5/16 407/28 |
| 2,327,296 A | * | 8/1943 | Wildhaber | B23F 1/08 409/51 |
| 2,463,725 A | * | 3/1949 | Stonebraker | B23F 17/001 409/26 |
| 2,579,422 A | * | 12/1951 | Handy | B23F 5/202 409/36 |
| 2,711,673 A | * | 6/1955 | Miller | B23F 9/082 29/90.6 |
| 2,737,854 A | * | 3/1956 | Van Acker | B23F 5/20 409/12 |
| 3,371,395 A | * | 3/1968 | Wildhaber | B23F 21/10 407/28 |
| 4,139,327 A | | 2/1979 | Kuehl | |
| 5,622,459 A | | 4/1997 | Basstein | |
| 5,845,533 A | | 12/1998 | Basstein | |
| 2006/0090340 A1 | | 5/2006 | Fleytman | |

\* cited by examiner

INPUT PARAMETERS AND CALCULATED EXAMPLES OF HELICAL PINION GEAR

| No. | VARIOUS FACTORS OF ELEMENTS | SYMBOL | CALCULATION EXPRESSION | UNIT | CALCULATED EXAMPLE AND NOTE |
|---|---|---|---|---|---|
| 1 | NORMAL MODULE | $m_n$ | INPUT | | 0.85 |
| 2 | NUMBER OF TEETH | $z$ | INPUT | | 6 |
| 3 | NORMAL PRESSURE ANGLE | $\alpha_n$ | INPUT | ° | 20° |
| 4 | HELIX ANGLE | $\beta$ | INPUT | ° | 55 |
| 5 | OUTSIDE DIAMETER | $d_a$ | INPUT | mm | 11.272 |
| 6 | BOTTOM DIAMETER | $d_f$ | INPUT | mm | 7.447 |
| 7 | NORMAL CIRCULAR TOOTH THICKNESS | $S_n$ | INPUT | mm | 1.583 |
| 8 | MODULE ON PLANE PERPENDICULAR TO AXIS | $m_t$ | $\dfrac{m_n}{\cos\beta}$ | | 1.481930 |
| 9 | DIAMETER OF PITCH CIRCLE | $d_p$ | $m_t z$ | mm | 8.891579 |
| 10 | PRESSURE ANGLE ON PLANE PERPENDICULAR TO AXIS | $\alpha_t$ | $\tan^{-1}\left(\dfrac{\tan\alpha_n}{\cos\beta}\right)$ | ° | 32.398° |
| 11 | DIAMETER OF BASE CIRCLE | $d_b$ | $d_b \cos\alpha_t$ | mm | 7.508 |
| 12 | CIRCULAR TOOTH THICKNESS ON PLANE PERPENDICULAR TO AXIS | $S_t$ | $\dfrac{S_n}{\cos\beta}$ | mm | 2.759 |
| 13 | TOOTH THICKNESS ON BASE CIRCLE PERPENDICULAR TO AXIS | $S_{bt}$ | $\left(\dfrac{2S_t}{d_p}+2inv\alpha_t\right)\cdot\dfrac{d_b}{2}$ | mm | 2.849 |
| 14 | AXIAL MODULE | $m_x$ | $\dfrac{m_n}{\sin\beta}$ | | 1.038 |

FIG. 13

CALCULATED EXAMPLE OF CUTTER HAVING SPUR GEAR SHAPE

| | | | | | |
|---|---|---|---|---|---|
| 15 | DEDENDUM BOTTOM CLEARANCE OF FG | $C_{FG}$ | $0.25 m_n$ | mm | 0.213 |
| 16 | OUTSIDE DIAMETER | $d_{aSC}$ | $d_{SC} + 2C_{FG}$ | mm | 11.697 |
| 17 | PRESSURE ANGLE ON OUTSIDE DIAMETER | $\alpha_{aSC}$ | $\cos^{-1} \dfrac{d_b}{d_{aSC}}$ | ° | 50.069° |
| 18 | VIRTUAL CIRCULAR TOOTH THICKNESS ON OUTSIDE DIAMETER | $S_{at}$ | $\left(\dfrac{2S_{bt}}{d_b} - 2 inv\alpha_{aSC}\right) \cdot \dfrac{d_{aSC}}{2}$ | mm | 0.686 |
| 19 | VIRTUAL HELIX ANGLE ON OUTSIDE DIAMETER | $\beta_a$ | $\tan^{-1}\left(\dfrac{d_{aSC} \cdot \tan\beta}{d_p}\right)$ | ° | 61.974° |
| 20 | ACTUAL CIRCULAR TOOTH THICKNESS ON OUTSIDE DIAMETER | $S_{atSC}$ | INPUT | mm | 0 ZERO WHEN TOOTH TIP IS POINTED |
| 21 | CUTTING EDGE THICKNESS (FACE WIDTH) | $b_{SC}$ | $\dfrac{S_{at} - S_{atSC}}{\tan\beta_{aSC}}$ | mm | 0.365 |
| 22 | THEORETICALLY MAXIMUM VALUE OF CUTTING EDGE THICKNESS (FACE WIDTH) | $b_{SCmax}$ | $\dfrac{S_{at}}{\tan\beta_{aSC}}$ | mm | 0.365 (REFERENCE VALUE) MAXIMUM WHEN TOOTH TIP IS POINTED |
| 23 | CIRCULAR TOOTH THICKNESS ON PITCH CIRCLE | $S_{tSC}$ | $S_t - (S_{at} - S_{atSC})\dfrac{d_p}{d_{aSC}}$ | mm | 2.238 |

FIG. 14

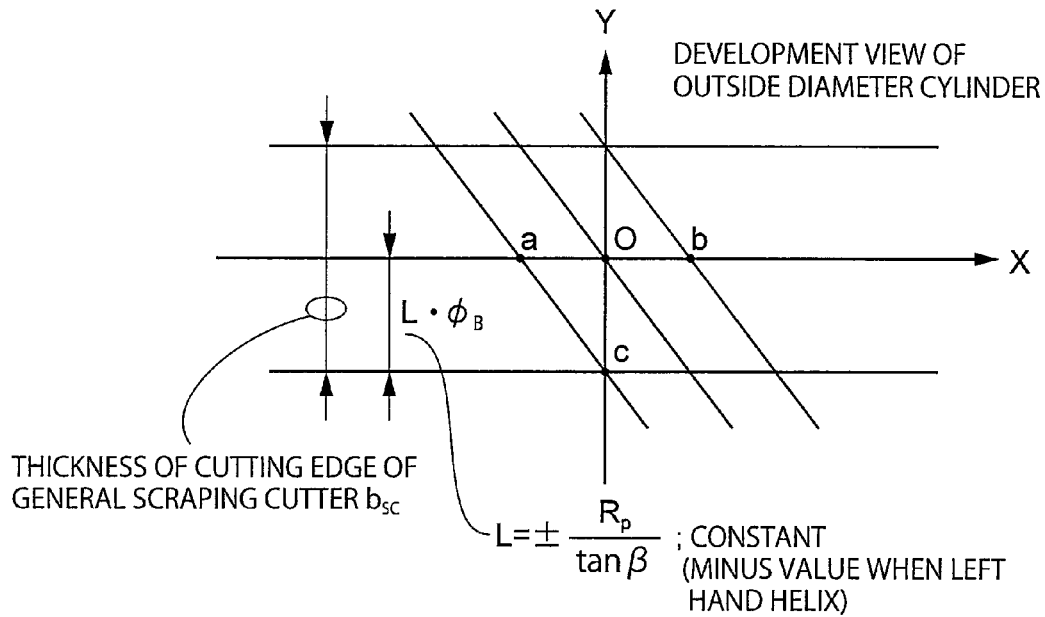
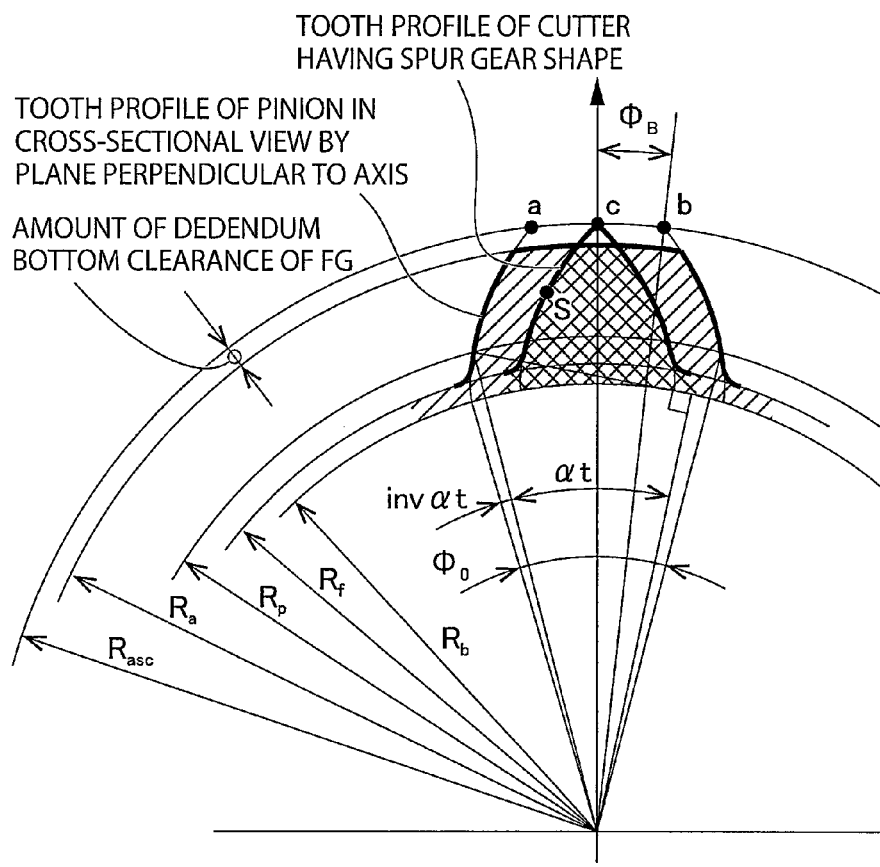
FIG. 19

| ITEM | PARAMETER | SYMBOL | VALUE |
|---|---|---|---|
| PG | MODULE | | 0.85 |
| | PRESSURE ANGLE | | 20° |
| | NUMBER OF TEETH | | 6 |
| | HELIX ANGLE | | 55° LEFT |
| | RACK SHIFT COEFFICIENT | | 0.4 |
| | DIAMETER OF REFERENCE PITCH CIRCLE | | $\phi$ 8.892 |
| | FACE WIDTH | | 9 |
| SC | MODULE | mn | 1.48192978 |
| | PRESSURE ANGLE | $\alpha$ | 32° 24' |
| | NUMBER OF TEETH | z | 6 |
| | HELIX ANGLE | $\beta$ | – |
| | OUTSIDE DIAMETER | OD | $\phi$ 11.697  0/−0.01 |
| | TOOTH DEPTH | h | 2.125 |
| | NORMAL CIRCULAR TOOTH THICKNESS | Sn | 2.23794 |
| | DIAMETER OF REFERENCE PITCH CIRCLE | d | $\phi$ 8.8916 |
| | OVER PIN DIAMETER | df | $\phi$ 17.2951 |
| | PIN DIAMETER | dp | $\phi$ 4.6650 |

FIG. 31

TOOL FOR CUTTING GEAR AND METHOD FOR CUTTING GEAR

CROSS-REFERENCE TO RELATED APPLICATIONS

This application claims priority to Japanese Patent Application No. 2012-112867 filed on May 16, 2012, the disclosure of which is hereby incorporated by reference in its entirety.

FIELD OF THE INVENTION

The present invention relates to a tool for cutting a gear and a method for cutting a gear. In particular, the present invention relates to a tool for cutting a face gear to be meshed with a helical gear whose axis is not parallel to that of the face gear, and a method for cutting the face gear.

BACKGROUND ART

Face gears (Crown gears), which are one kind of gears, are widely used in the field of driving wheels mainly used in spinning reels for fishing in Japan. However, in recent years, usefulness of the face gears has been widely regarded, and the face gears have been developed or used also in the field of gearboxes with orthogonal axes and the field relating to aircrafts.

As methods for machining a face gear, the following three methods can be mainly taken by way of example. Namely, there are: (1) forging or casting by means of a female die tooth profile manufactured by an electrode; (2) gear cutting by means of a shaper cutter (pinion cutter); and (3) machining cutting for directly cutting teeth by means of a machining center, with the aid of a ball end mill and theoretical tooth profile coordinates.

The forging or casting of item (1) is a machining method suited for mass production, but an achievable precision differs depending on a precision and a manufacturing technique of a male die electrode for manufacturing the female die. In order to improve a meshing precision, a pair of gears have to be sometimes lapped after being forged.

The gear cutting by means of a shaper cutter of item (2) is not often utilized at present, because its machining efficiency is unsatisfactory, a tooth flank modification is difficult, only few suitable machines (shaper machines) are present, manufacture and management of a tool (helical pinion cutter) are difficult, and so on.

The machining cutting of the item (3) can manufacture a tooth profile whose tooth flank has been modified, so that a high transmission precision can be obtained. However, since it takes a long time for machining, the machining cutting is not suited for mass production.

SUMMARY OF THE INVENTION

The present invention has been made in view of the above circumstances. The object of the present invention is to provide a tool for precisely, efficiently cutting a skew gear, in particular, a face gear, to be meshed with a helical gear, and a method for cutting the face gear.

The present invention is a tool having a spur gear shape for cutting, as a gear to be cut, a skew gear to be meshed with a predetermined helical gear, the tool comprising a cutting edge portion having a cutting edge of a tooth-profile curvilinear shape that is the same as one of at least a pair of tooth-profile curvilinear shapes of a tooth profile of the helical gear in a cross-sectional view by a plane perpendicular to an axis of the helical gear, wherein: a circular tooth thickness of the cutting edge portion is smaller than a circular tooth thickness of the tooth profile of the helical gear in a cross-sectional view by a plane perpendicular to the axis; a tooth depth of the cutting edge portion is larger than a tooth depth of the helical gear; and when a circular tooth thickness of a tooth tip of the cutting edge portion is represented as $S_{atSC}$, a circular tooth thickness on a virtual outside diameter of the tooth profile of the helical gear in a cross-sectional view by a plane perpendicular to the axis is represented as $S_{at}$, a helix angle on the virtual outside diameter of the tooth profile of the helical gear in a cross-sectional view by a plane perpendicular to the axis is represented as $\beta_a$, and a face width of the cutting edge portion is represented as $b_{sc}$, the following Expression 1 is satisfied.

$$b_{SC} \leq \frac{S_{at} - S_{atSc}}{\tan\beta_a} \qquad \text{Expression 1}$$

According to the present invention, the tool can precisely cut a skew gear, in particular, a face gear, to be meshed with a helical gear, with a high machining efficiency into a theoretically right tooth profile, although the tool has a spur gear shape easy to handle.

For example, correspondingly to each pair of tooth-profile curvilinear shapes of the tooth profile of the helical gear in a cross-sectional view by a plane perpendicular to the axis, the cutting edge portion has cutting edges of a tooth-profile curvilinear shape on a right side and a left side. In this case, since the right and left cutting edges of a tooth-profile curvilinear shape efficiently contribute to the cutting, the machining efficiency can be improved.

For example, the helical gear is an involute cylindrical gear. In addition, for example, the gear to be cut is a face gear.

In addition, it is preferable that two auxiliary plates are provided to sandwich therebetween the cutting edge portion. In this case, a strength of the tool can be reinforced by the two auxiliary plates. In this case, it is preferable that each of the two auxiliary plates has a helical gear shape.

In addition, the present invention is a tool having a spur gear shape for cutting, as a gear to be cut, a skew gear to be meshed with a predetermined helical gear, the tool comprising a cutting edge portion having at least one cutting edge having a tooth-profile curvilinear shape, wherein: a circular tooth thickness of the cutting edge portion is smaller than a circular tooth thickness of a tooth profile of the helical gear in a cross-sectional view by a plane perpendicular to an axis of the helical gear; a tooth depth of the cutting edge portion is larger than a tooth depth of the helical gear; and a face width of the cutting edge portion has an angle which causes a cutting edge to have a chevron shape in a cross-sectional view by a plane including the axis.

According to the present invention, the tool has an improved strength, although the tool has the spur gear shape easy to handle.

In this case, it is preferable that, when a given point on an edge of a cutting edge having a tooth-profile curvilinear shape of a tool having a standard spur gear shape not having a chevron angle is represented as Expression 3, Expression 3:

In XYZ coordinate system, when an origin is a center of a pinion, a Y axis is an axis of the pinion, and a Z axis is a center of tooth thickness of a tooth profile of the pinion in a cross-sectional view by a plane perpendicular to an axis of the pinion, coordinates $(X_S, Y_S, Z_S)$ of a given point S of an edge of an acting cutting edge of a cutter having a standard spur gear shape not having a chevron angle are:

coordinates of the point S on a right tooth flank side $$\begin{cases} \tau_s = -\varphi_B + \dfrac{\varphi_0}{2} + inv(\alpha_t) - inv(\alpha_S) \\ X_S = R_S \sin\tau_S \\ Y_S = -L \cdot \varphi_B \\ Z_S = R_S \cos\tau_S \end{cases}$$

coordinates of the point S on a left tooth flank side $$\begin{cases} \tau_s = \varphi_B - \dfrac{\varphi_0}{2} - inv(\alpha_t) + inv(\alpha_S) \\ X_S = R_S \sin\tau_S \\ Y_S = L \cdot \varphi_B \\ Z_S = R_S \cos\tau_S \end{cases}$$

with the use of parameters of Expression 2,

Expression 2

$$\begin{bmatrix} \alpha_n; & \text{normal pressure angle of pinion} \\ \beta; & \text{helix angle of pinion} \\ s_n; & \text{normal tooth thickness of pinion} \\ R_p; & \text{radius of reference pitch circle of pinion and cutter } \left(=\dfrac{d_p}{2}\right) \\ \varphi_0; & \text{tooth thickness angle of pinion} = \dfrac{s_n}{R_p \cdot \cos\beta} \\ \alpha_t; & \text{pressure angle of pinion on plane perpendicular to axis} = \\ & \tan^{-1}\left(\dfrac{\tan\alpha_n}{\cos\beta}\right) \\ R_b; & \text{radius of base circle of pinion and cutter} = R_p \cos\alpha_t \left(=\dfrac{d_b}{2}\right) \\ R_{aSC}; & \text{radius of outside diameter circle of cutter } \left(=\dfrac{d_{aSC}}{2}\right) \end{bmatrix}$$

-continued $$\begin{bmatrix} \alpha_{aSC}; & \text{pressure angle on outside diameter of cutter} = \cos^{-1}\dfrac{R_b}{R_{aSC}} \\ S_{aiSC}; & \text{actual circular tooth thickness on outside diameter of cutter} \\ & \text{(when } S_{aiSC} = 0\text{, tooth tip of cutter is pointed)} \\ \varphi_B; & \text{phase angle} = \dfrac{\varphi_0}{2} + inv(\alpha_t) - inv(\alpha_{aSC}) - \dfrac{S_{aiSC}}{2R_p} \\ L; & \text{constant} = \pm \dfrac{R_p}{\tan\beta}\text{, when pinion is right hand helix, sign is} + \\ & \text{when pinion is left hand helix, sign is} - \\ R_S; & \text{radius of point S of cutter} \\ \alpha_S; & \text{pressure angle of point S of cutter on plane perpendicular to} \\ & \text{axis} = \cos^{-1}\dfrac{R_b}{R_S} \\ \tau_S; & \text{development angle between point S and Y axis} \\ inv( ); & \text{involute function } \{inv(\alpha) = \tan\alpha - \alpha\} \end{bmatrix}$$

the tooth-profile curvilinear shape of the cutting edge portion has a chevron angle that satisfies Expression 5, Expression 5:

In XYZ coordinate system, when an origin is a center of a pinion, a Y axis is an axis of the pinion, and a Z axis is a center of tooth thickness of a tooth profile of the pinion in a cross-sectional view by a plane perpendicular to an axis of the pinion, coordinates $(X_S, Y_S, Z_S)$ of a given point S of an edge of an acting cutting edge of a cutter having a spur gear shape having a chevron angle are:

coordinates of the point S on a right tooth flank side $$\begin{cases} \tau_S = -\varphi_B + \dfrac{\varphi_0}{2} + inv(\alpha_t) - inv(\alpha_S) - \Delta\varphi \\ X_S = R_S \sin\tau_S \\ Y_S = -L \cdot (\varphi_B + \Delta\varphi) \\ Z_S = R_S \cos\tau_s \end{cases}$$

coordinates of the point S on a left tooth flank side $$\begin{cases} \tau_s = \varphi_B - \dfrac{\varphi_0}{2} + inv(\alpha_t) - inv(\alpha_S) + \Delta\varphi \\ X_S = R_S \sin\tau_S \\ Y_S = L \cdot (\varphi_B + \Delta\varphi) \\ Z_S = R_S \cos\tau_s \end{cases}$$

with the use of parameters of Expression 4,

Expression 4

$$\begin{cases} \eta; & \text{chevron angle} \\ \Delta\varphi; & \text{phase angle between cutting edge end surface and} \\ & \text{point } S \text{ of a general tool having a spur gear} \\ & \text{shape } \Delta\varphi \text{ satisfies } f(\Delta\varphi) = (R_{aSC} - R_s\cos\tau_S) \\ & \tan\eta - \dfrac{R_p}{\tan\beta} \cdot \Delta\varphi = 0 \end{cases}.$$

In this case, it is possible to significantly efficiently cut a gear, in particular a face gear, to be meshed with a helical gear.

In addition, it is preferable that a plurality of the cutting edge portions are axially provided. In this case, since the respective cutting edge portions efficiently contribute to the cutting, the machining efficiency can be improved.

In this case, it is preferable that the plurality of cutting edge portions are provided at equal pitches therebetween with the same phase as each other. Such an embodiment is advantageous in manufacturing a face gear having a wide face width.

Alternatively, in this case, it is preferable that the plurality of cutting edge portions are provided with their phases being equally displaced from each other, in accordance with a tooth trace shape by the helix angle of the helical gear. According to such a structure, the machining efficiency can be significantly improved.

In addition, it is preferable that a side surface of the tooth tip of the cutting edge portion is provided with a predetermined relief angle. According to such a structure, the cutting performance can be significantly improved.

In addition, the present invention is a method for cutting, as a gear to be cut, a skew gear to be meshed with a predetermined helical gear, with the use of the tool having any one of the above features.

According to the present invention, it is possible to precisely, significantly efficiently cut a skew gear, in particular a face gear, to be meshed with a helical gear, into a theoretically right tooth profile.

BRIEF DESCRIPTION OF THE DRAWINGS

FIG. 13 is a table showing calculated examples of input parameters of the helical pinion gear;

FIG. 14 is a table showing calculated examples of parameters of the cutter having a spur gear shape;

FIG. 19 is views defining parameters relating to a face width of the cutter having a spur gear shape of FIG. 18;

FIG. 31 is a table showing parameters relating to an actually manufactured tool.

DETAILED DESCRIPTION OF THE INVENTION

A tool according to one embodiment of the present invention is called "cutter having a spur gear shape SC", which is a tool to be meshed with a gear to be cut so as to cut the same. Herein, the gear to be cut generally means a gear that can be accurately meshed with a helical gear. In the present invention, a face gear FG is employed as the gear to be cut.

FIGS. 1(a) to 1(d) show a general face gear FG to be meshed with a helical pinion gear PG in an offset manner. FIGS. 2(a) to 2(d) show the cutter having a spur gear shape SC for cutting the face gear FG, which is located on a cutting position. As shown in FIGS. 2(a) to 2(d), the most standard function of the cutter having a spur gear shape SC in this embodiment is to cut the face gear FG to be meshed with the helical pinion gear PG, by means of cutting edges of a spur gear shape.

Figure 1:
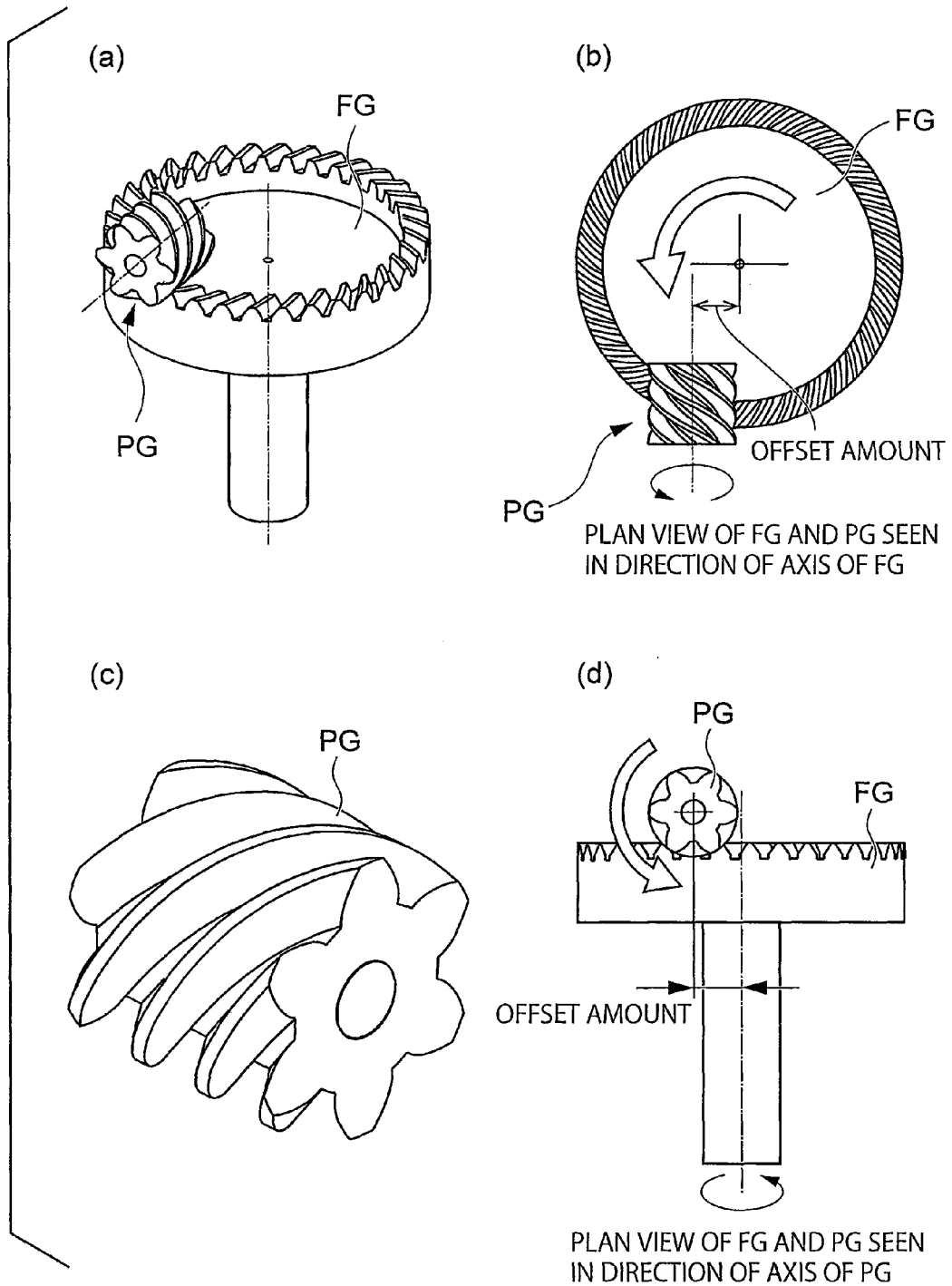
FIG. 1 is schematic views showing a general face gear to be meshed with a helical pinion gear in an offset manner.
Figure 2:
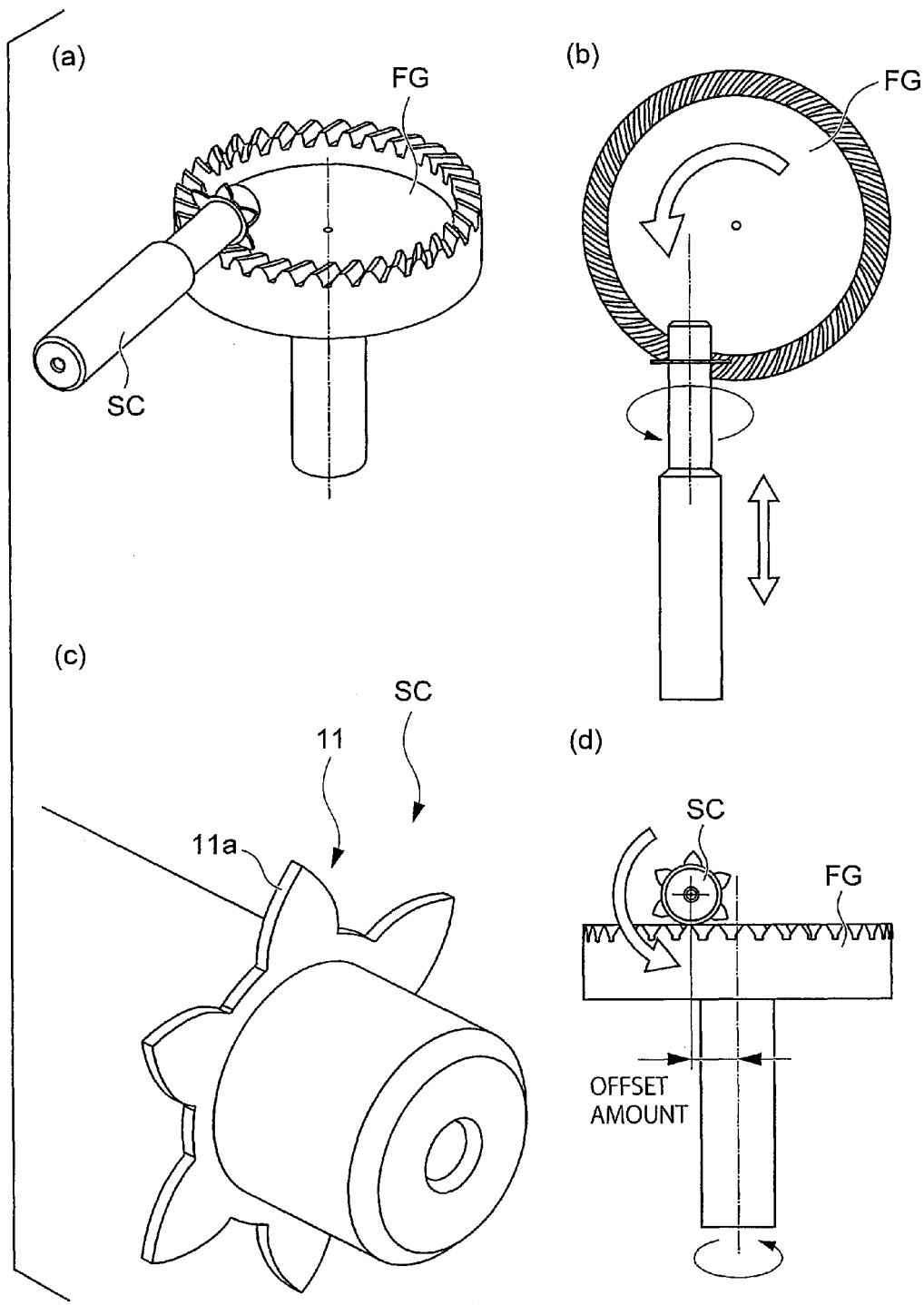
FIG. 2 is schematic views showing a cutter having a spur gear shape (one embodiment of the present invention) for cutting a face gear, which are located on a cutting position.
Figure 3:
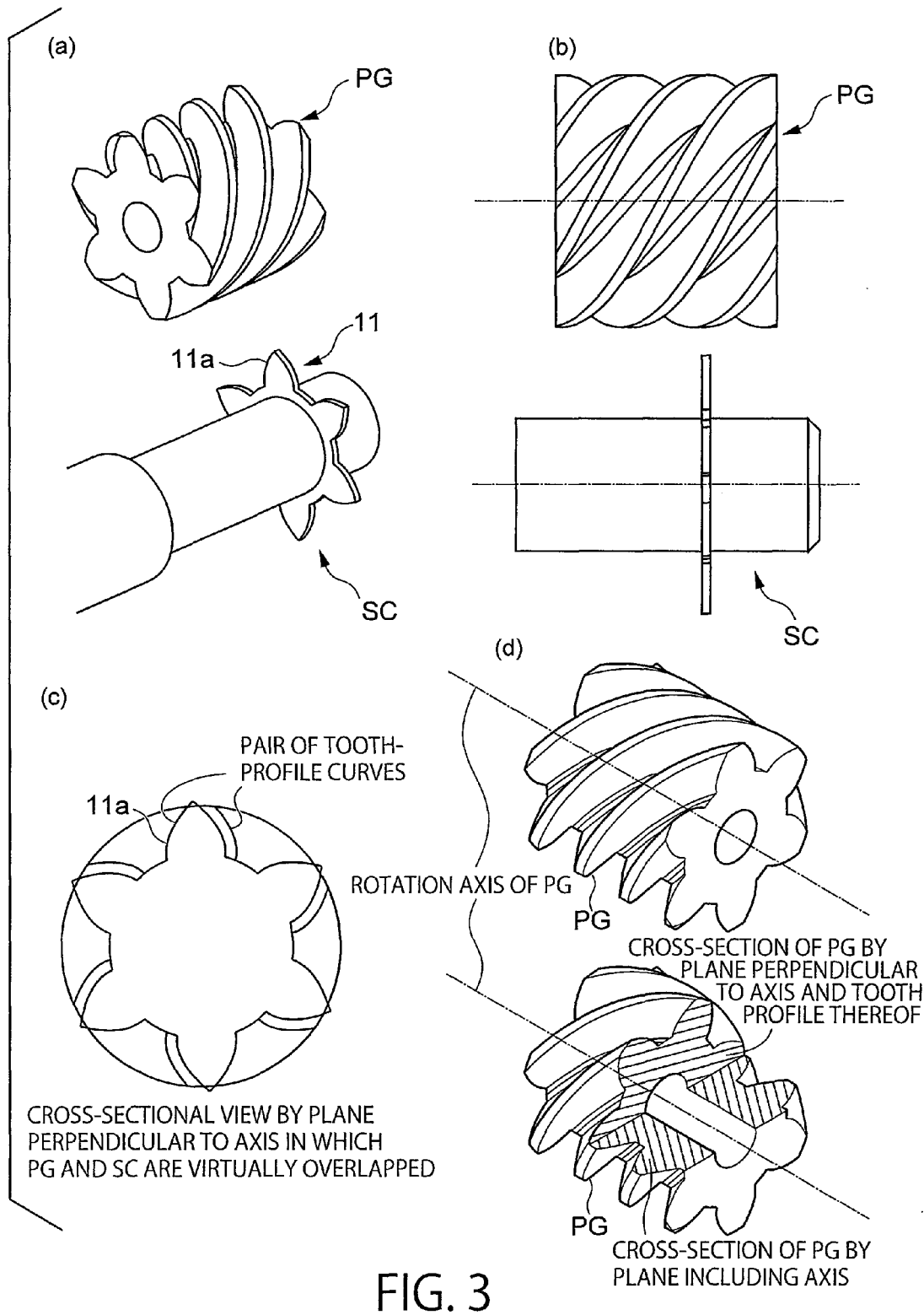
FIG. 3 is schematic views showing a relationship between the cutter having a spur gear shape in this embodiment and a helical gear.

The cutter having a spur gear shape SC in this embodiment is a tool for cutting, as a gear to be cut, a gear to be meshed with the predetermined helical pinion gear PG. The cutter having a spur gear shape SC includes a cutting edge portion 11 having a cutting edge 11a which has a tooth-profile curvilinear shape that is the same as one of at least a pair of tooth-profile curvilinear shapes of a tooth profile of the helical pinion gear PG in a cross-sectional view by a plane perpendicular to an axis thereof (see FIGS. 3(a) to 3(d)). A circular tooth thickness of the cutting edge portion 11 is smaller than a circular tooth thickness of the tooth profile of the helical pinion gear PG in a cross-sectional view by a plane perpendicular the axis thereof (see FIG. 3(c)). A tooth depth of the cutting edge portion 11 is larger than a tooth depth of the helical pinion gear PG (see FIG. 3(c)). When a circular tooth thickness of a tooth tip of the cutting edge portion 11 is represented as $S_{atSC}$, a circular tooth thickness on a virtual outside diameter of the tooth profile of the helical pinion gear PG in a cross-sectional view by a plane perpendicular to the axis thereof is represented as $S_{at}$, a helix angle on the virtual outside diameter of the tooth profile of the helical pinion gear PG in a cross-sectional view by a plane perpendicular to the axis thereof is represented as $\beta_a$, and a face width of the cutting edge portion 11 is represented as $b_{sc}$, the following Expression 6 (=Expression 1) is satisfied.

$$b_{SC} \leq \frac{S_{at} - S_{atSC}}{\tan\beta_{aSC}} \quad \text{Expression 6}$$

Figure 4:
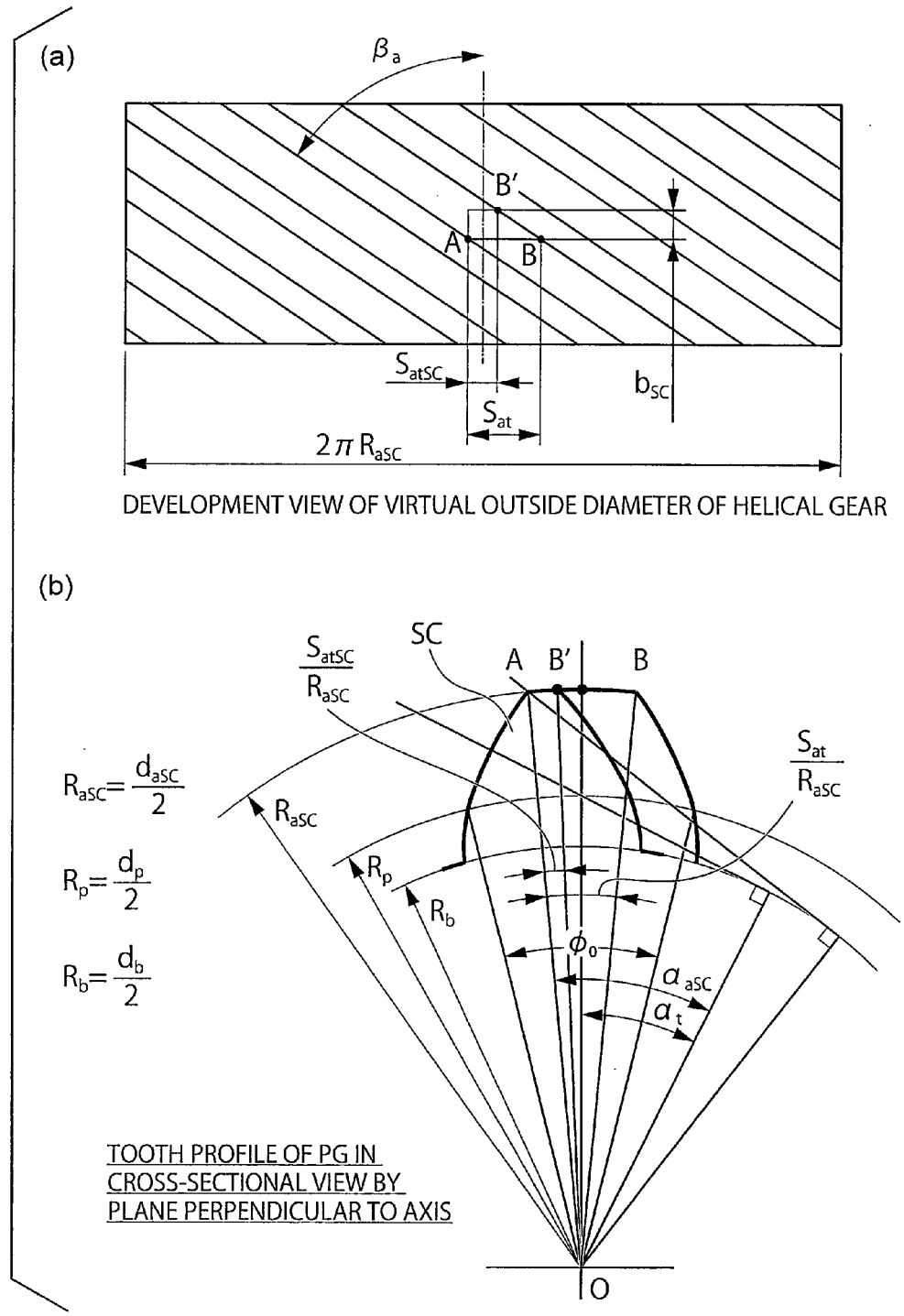
FIG. 4 is views defining parameters relating to a face width of the cutter having a spur gear shape.

FIGS. 4(a) and 4(b) show the above relationship. When $S_{atSC}$ is equal to zero ($S_{atSC}=0$), the tooth tip of the tooth profile of the cutter having a spur gear shape SC has a pointed shape, and the face width of the cutter having a spur gear shape SC is the following value which is maximum.

$$b_{SCmax} = \frac{S_{at}}{\tan\beta_a} \quad \text{Expression 7}$$

A module of the tooth profile of the cutter having a spur gear shape SC is equal to a module mt of the helical pinion gear PG on a plane perpendicular to an axis thereof (transverse module). The module nit of the helical pinion gear PG on a plane perpendicular to an axis thereof is given by the following Expression 8.

$$m_t = \frac{m_M}{\cos\beta} \quad \text{Expression 8}$$

Thus, when the helix angle $\beta$ is larger, the module of the cutter having a spur gear shape SC becomes larger.

Figure 5:
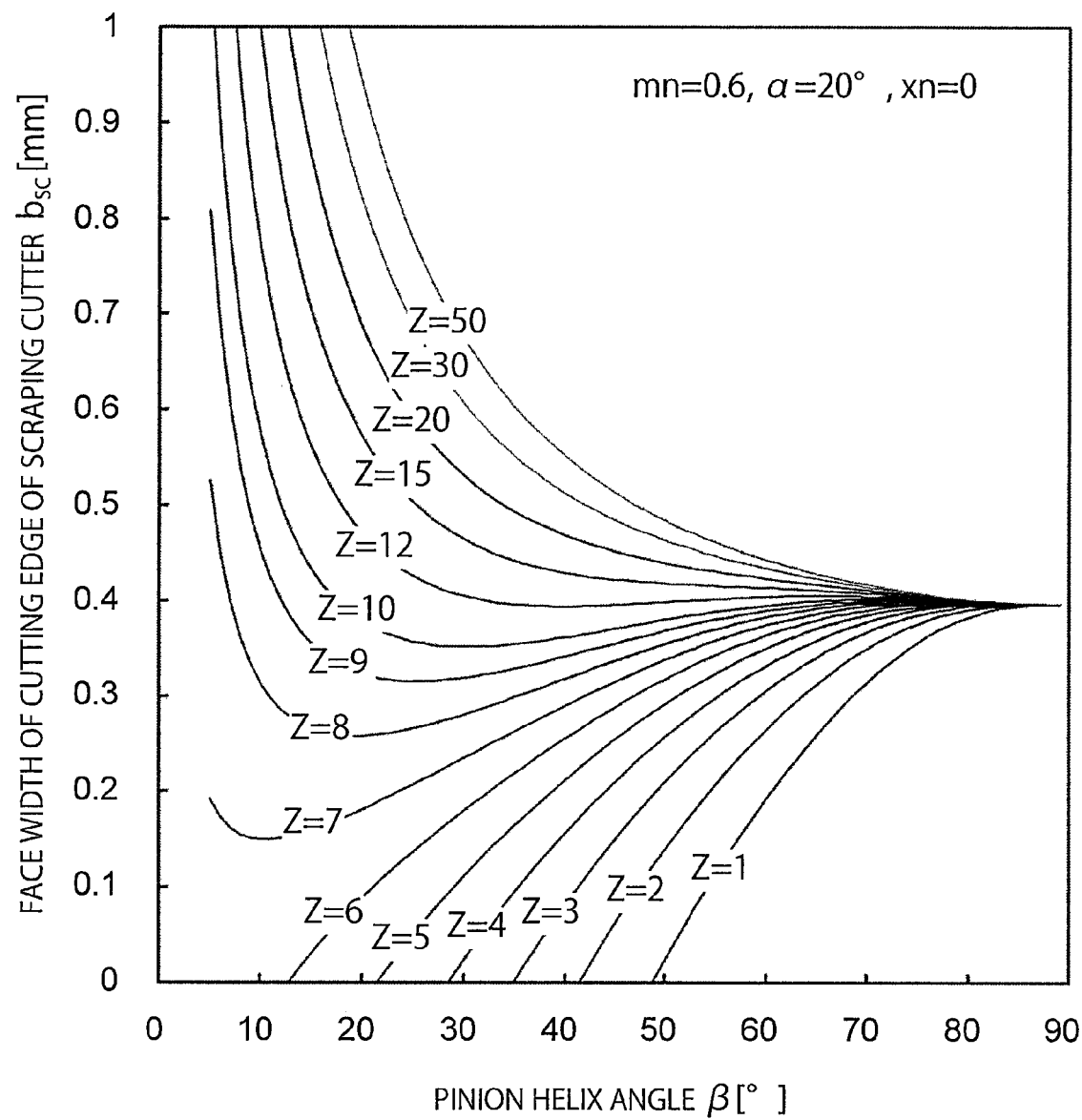
FIG. 5 is a view showing a relationship among the number of teeth, a helix angle and a face width.

A relationship between the helix angle $\beta$ and the face width $b_{sc}$ of the cutting edge portion 11 of the cutter having a spur gear shape SC is shown in the graph, in which the number of teeth of the helical pinion gear PG is represented as Z. FIG. 5 shows a graph in which a module mn=0.6, a pressure angle $\alpha$=20° and a rack shift coefficient xn=0, for example. In addition, $S_{atSC}$=0 (the tooth tip of the tooth profile of the cutter having a spur gear shape SC has a pointed shape).

As understood from FIG. 5, when the number of teeth is larger and the helix angle is smaller, the face width or the thickness of the cutting edge of the cutting edge portion 11 can be made larger, which is advantageous in designing the cutter having a spur gear shape SC.

Next, cutting (gear cutting) of the face gear FG by the cutter having a spur gear shape SC is described. The gear cutting of the face gear FG by the cutter having a spur gear shape SC is performed by moving the cutting edge of a tooth-profile curvilinear shape of the cutter having a spur gear shape SC to, as if, follow (trace) a tooth flank profile of the pinion gear PG to be meshed with the face gear FG.

The cutter having a spur gear shape SC is rotated in synch with a blank of the face gear FG at the same velocity ratio as a velocity ratio at which the face gear FG and the helical pinion gear PG are meshed with each other. After a proper cutting amount has been set by reducing a space between axes of the cutter having a spur gear shape SC and the face gear FG, the face gear FG is cut by differentially (relatedly) synchronizing rotation of the cutter having a spur gear shape SC and axial movement of the cutter having a spur gear shape SC, so as to feed the cutter having a spur gear shape SC in the face width direction of the face gear FG. Thus, when the cutting process is performed, a tri-axial synchronic process, i.e., a related cooperation of the rotation of the face gear FG, the rotation of the cutter having a spur gear shape SC and the axial movement of the cutter having a spur gear shape SC, is needed.

Figure 6:
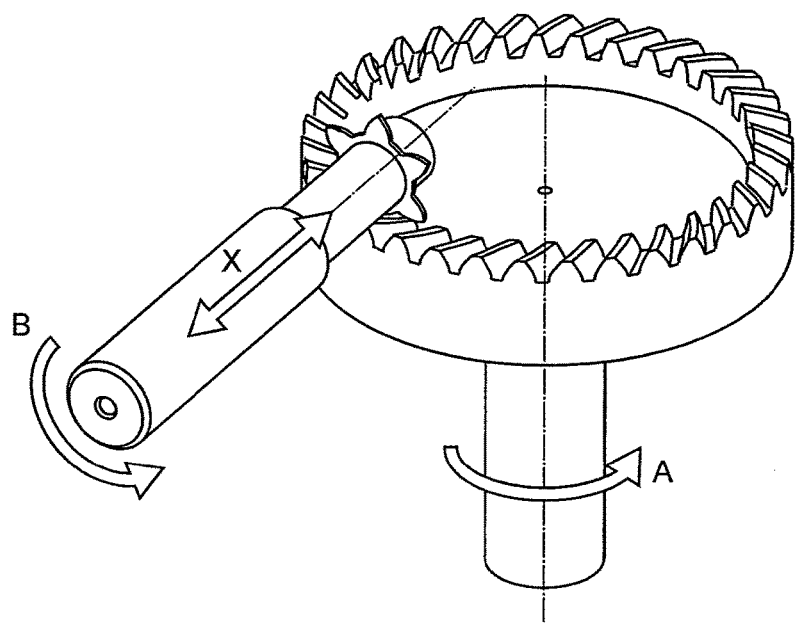
FIG. 6 is a view for explaining axes upon gear cutting.

When a rotation axis of the face gear FG is set as A axis, a rotation axis of the cutter having a spur gear shape SC is set as B axis, and an axial movement axis (feeding axis) of the cutter having a spur gear shape SC is set as X axis (see FIG. 6), a synchronic driving with the A axis as a reference is obtained by the following Expression 9.

$$\begin{aligned} P_X &= x[\text{mm}] \\ P_A &= \theta_A[\text{rad}] \\ P_B &= n \cdot \theta_A + \frac{x \cdot \tan\beta}{R_p}[\text{rad}] \end{aligned} \quad \text{Expression 9}$$

Figure 7:
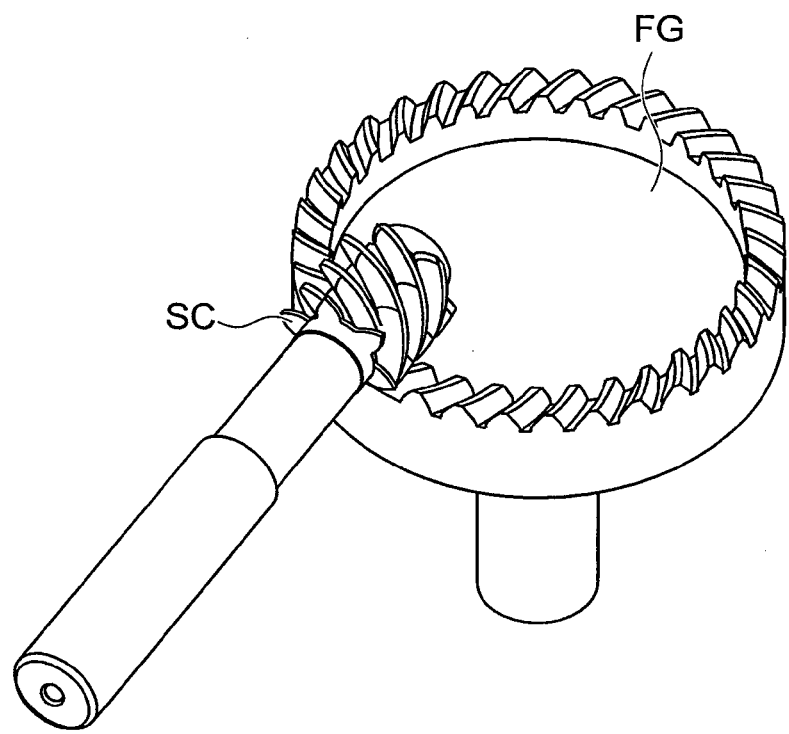
FIG. 7 is a view showing that the cutter having a spur gear shape, a helical pinion gear and the face gear are set on a meshing and machining position.
Figure 8:
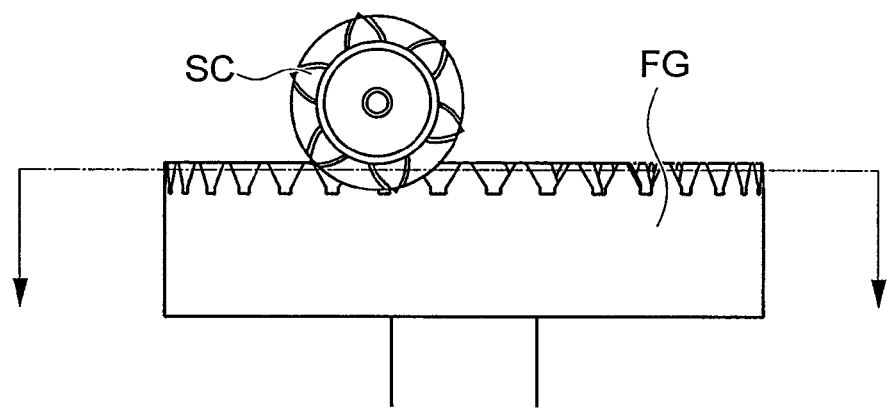
FIG. 8 is a view showing that the cutter having a spur gear shape and the face gear are meshed with each other, seen in an axial direction of the cutter having a spur gear shape (or a helical gear)

$\begin{pmatrix} n; \text{ velocity ratio of } FG/PG = \text{the number of} \\ \text{teeth of } Fg/\text{the number of teeth of } PG \\ \theta_A; \text{ rotation angle of } FG[\text{rad}] \\ x; \text{ axial movement amount of } SC[\text{mm}] = \\ \text{feeding amount} \\ R_p; \text{ radius of reference pitch circle of} \\ PG[\text{mm}] \\ \beta; \text{ helix angle on reference pitch circle of} \\ PG[\text{rad}] \\ Px, P_A, P_B; \text{ instruction value transmitted} \\ \text{to each axis} \end{pmatrix}$ Next, details of forming a tooth profile of the face gear FG are described. FIG. 8 shows the cutter having a spur gear shape SC and the face gear FG, which are meshed with each other as shown in FIG. 7, seen in a direction of an end surface of the cutter having a spur gear shape SC or the helical pinion gear PG by a plane perpendicular to axis thereof, with the helical pinion gear being virtually overlapped at a phase angle at which the helical pinion gear is meshed with the face gear.

Figure 9:
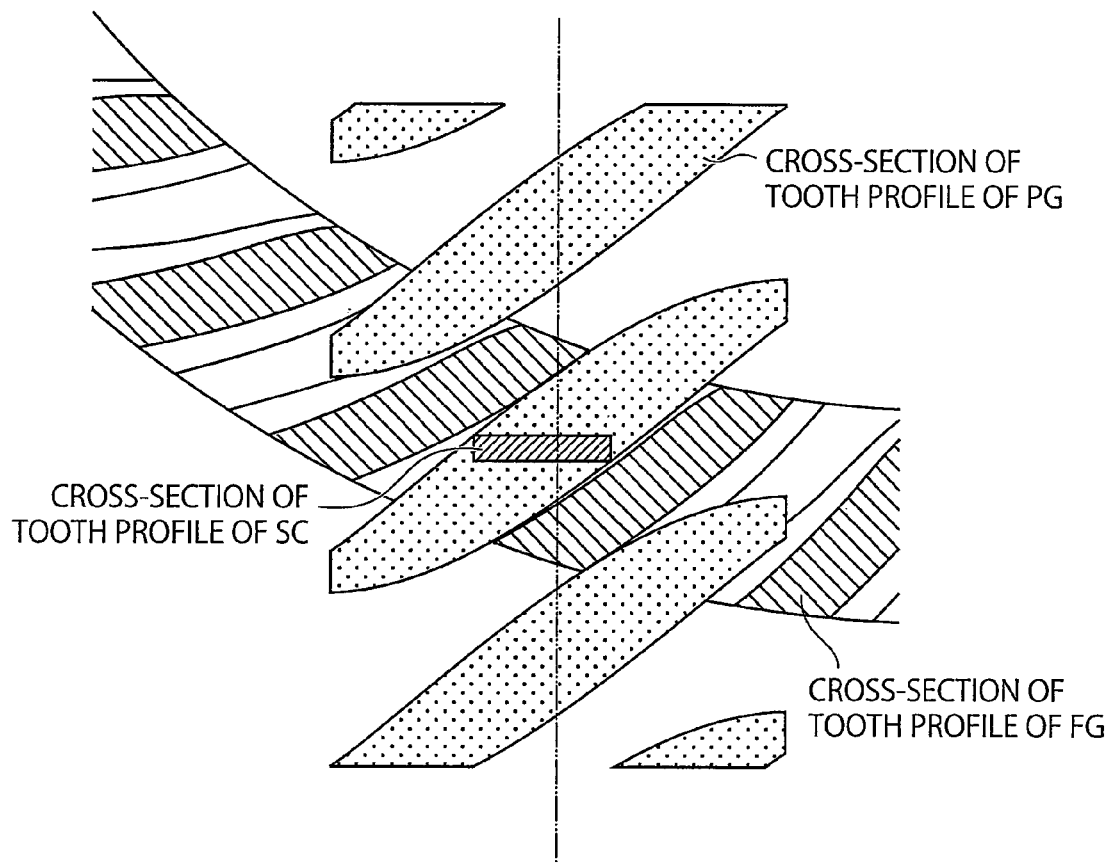
FIG. 9 is a view showing a positional relationship between a cutting edge of the cutter having a spur gear shape and a tooth profile of the face gear (or a pinion gear)

A chain line of FIG. 8 shows a plane in contact with a diameter of a reference pitch circle of the helical pinion gear PG. FIG. 9 shows the cross-section of the face gear FG by a plane perpendicular to an axis thereof, with the tooth profile portion being enlarged, seen in a direction of arrows in the plane of the chain line.

In FIG. 9, a cross-section of a tooth body of the face gear FG is shown by an area shaded downward to the right, a cross-section of a tooth body of the cutter having a spur gear shape SC is shown by an area shaded upward to the right, and a cross-section of a tooth body of the helical pinion gear PG is shown by a dotted area. The cross-section of the tooth body of the cutter having a spur gear shape SC has a rectangular shape, seen from the cross-section of the face gear FG by a plane perpendicular to an axis thereof.

By rotating the cutter having a spur gear shape SC synchronically with the face gear FG and differentially (relatedly) feeding the cutter having a spur gear shape SC in the axial direction of the cutter having a spur gear shape SC, two corners of the rectangle, which are located on diagonally opposed positions, follow (trace) a contour of the tooth profile of the face gear FG in a cross-sectional view by a plane perpendicular to the axis thereof. Thus, the tooth profile of the face gear FG is cut and formed by means of the cutter having a spur gear shape SC.

Figure 10:
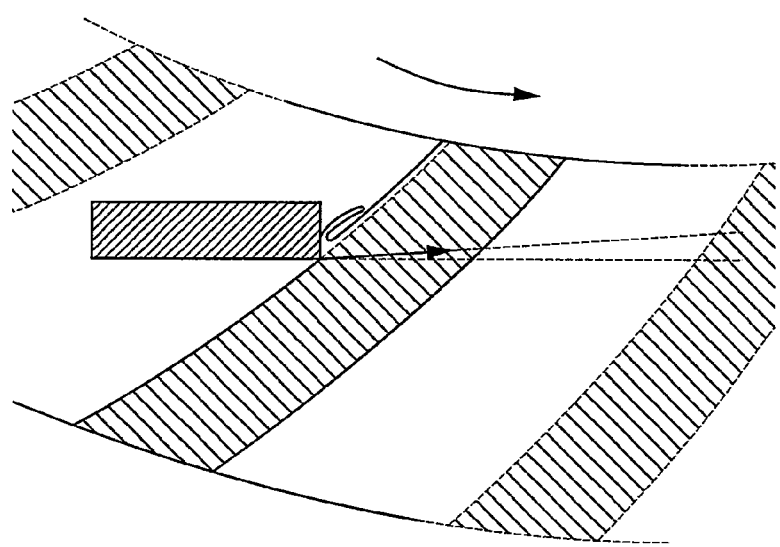
FIG. 10 is a view showing that a tooth flank of the face gear is cut by a tooth body having a rectangular cross-section of the cutter having a spur gear shape.

In a case in which the cutter having a spur gear shape SC is fed in a direction to a minor diameter of the face gear FG (upward in the sheet plane) while the cutter having a spur gear shape SC and the face gear FG are meshed and rotated, a lower right corner (edge) of the rectangular cross-section of the tooth body of the cutter having a spur gear shape SC cuts a concave tooth flank side of the face gear FG in accordance with a tooth flank of the helical pinion gear PG, as shown in FIG. 10. With respect to the tooth flank of the face gear FG, this cutting by the corner (edge) is like a cutting by a cutting edge of a cutting tool having obtuse angle.

Figure 11:
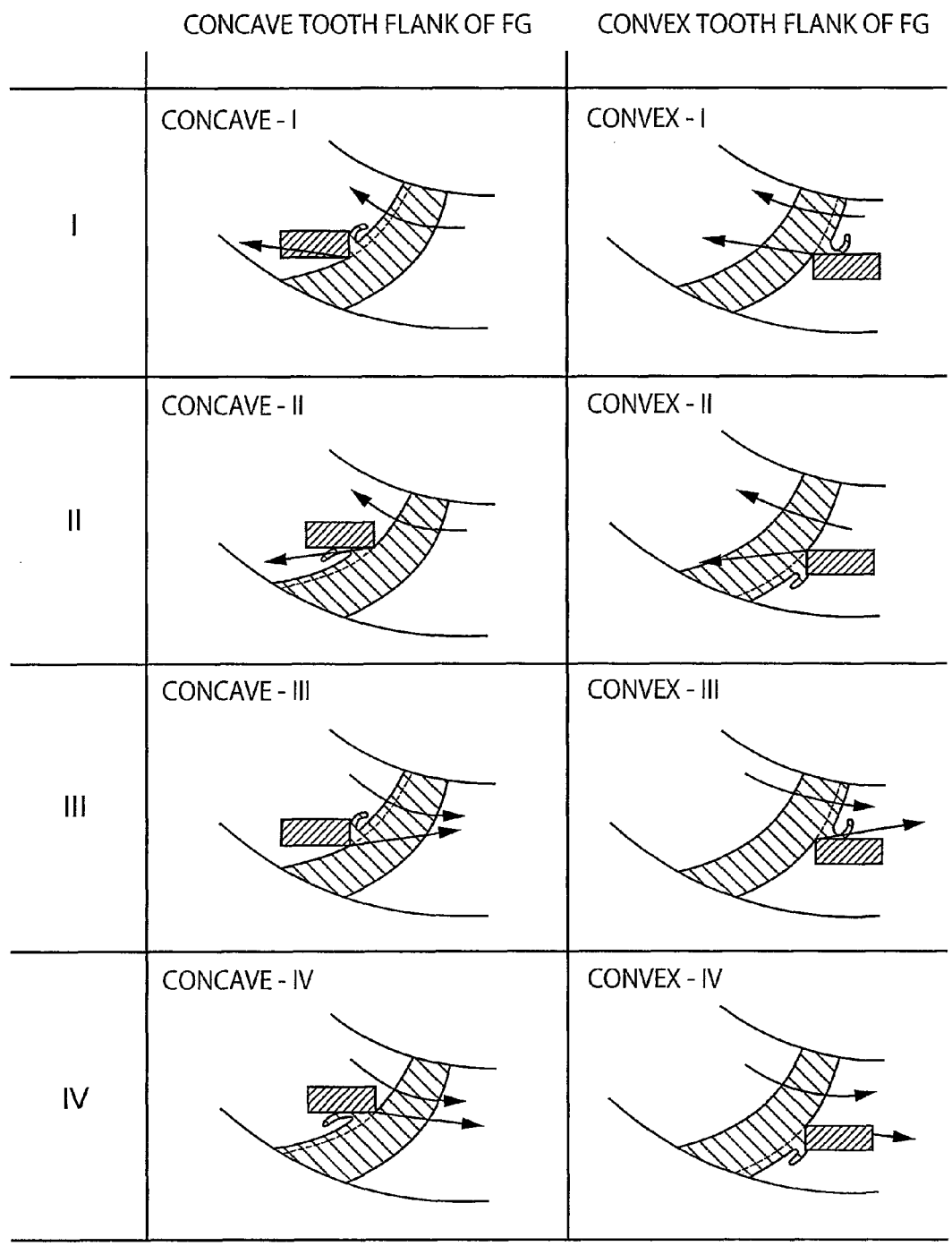
FIG. 11 is a table showing cutting patterns of the cutter having a spur gear shape.

The rotational direction and the feeding direction of the cutter having a spur gear shape SC shown in FIG. 10 are taken by way of example. Actually, there are two rotational directions (a normal rotational direction and a counter-rotational direction) of the cutter having a spur gear shape SC and the face gear FG and two feeding directions of the cutter having a spur gear shape SG (a direction from the major diameter of the face gear FG to the minor diameter thereof and a direction from the minor diameter of the face gear FG to the major diameter thereof), whereby there are four combination patterns in total. The four patterns I to IV are shown in FIG. 11. One of the patterns I to IV can be selected, depending on conditions such as a state of a burr on a tooth trace surface of a tool, a state of a burr formed upon gear cutting and a cutting velocity.

A cutting pattern, which is most suitable for performance of a cutting machine, material of a gear to be cut, machining conditions and so on, can be selected.

Figure 12:
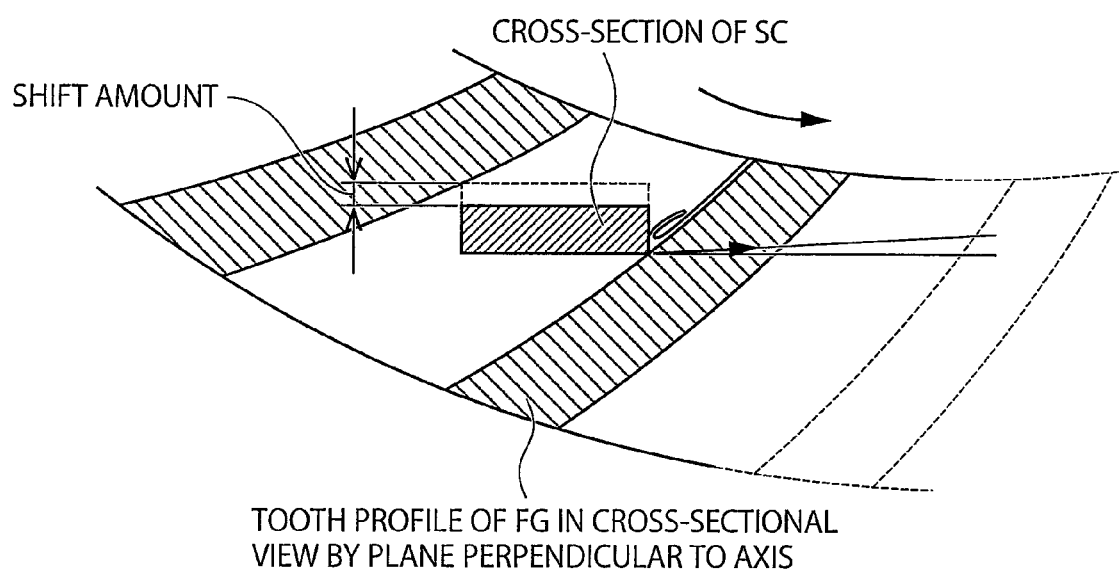
FIG. 12 is a view showing that the cutter having a spur gear shape is shifted in an axial direction of the cutter.

In order to obtain a gear cutting condition for excellent cutting performance, among conditions such as parameters of a face gear and a pinion gear and compatibility between a material to be cut and a material of a cutter, a concave tooth flank side of a face gear and a convex tooth flank side thereof may be processed with different cutting patterns. For example, the concave tooth flank side may be firstly processed with the CONCAVE-III type of FIG. 11, and then the convex tooth flank side may be processed with CONVEX-II type of FIG. 11. At this time, the face width of the cutter having a spur gear shape SC is previously reduced as compared with a generally design value. When the process of the concave tooth flank side is switched to the process of the convex tooth flank side, the cutter having a spur gear shape SC is shifted in the axial direction of the cutter, by a distance corresponding to the reduced face width (see FIG. 12).

By utilizing this relationship, a tool life of the cutter having a spur gear shape SC can be elongated. When the cutter having a spur gear shape SC cuts a number of teeth of face gears, the edge portion of the cutting edge of the cutter having a spur gear shape SC wears. By reprocessing (mainly grinding) an end surface of the face width, the edge portion of the cutting edge can be sharpened again. However, the face width of the cutter having a spur gear shape is reduced by the reprocessing. Thus, when teeth of a face gear are cut next time, it is necessary that the concave tooth flank side are firstly cut, that the cutter is shifted in the axial direction of the cutter by a distance corresponding to the reduced face width, and then that the convex tooth flank side are cut (see FIG. 12).

FIG. 13 shows input parameters of various factors of elements of a helical pinion gear to be meshed with a face gear and calculated examples. FIG. 14 shows examples of calculated values of a cutter having a spur gear shape corresponding to the helical pinion gear.

As shown in the respective drawings, a standard model of the aforementioned cutter having a spur gear shape SC is a cutter having a spur gear shape of a shaft integrated type, in which the cutting edge portion 11 is formed of one spur gear. However, various application examples can be considered.

Figure 15:
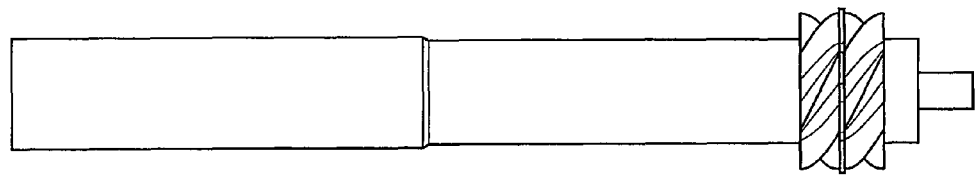
FIG. 15 is an overall view showing a cutter having a spur gear shape using auxiliary plates.
Figure 16:
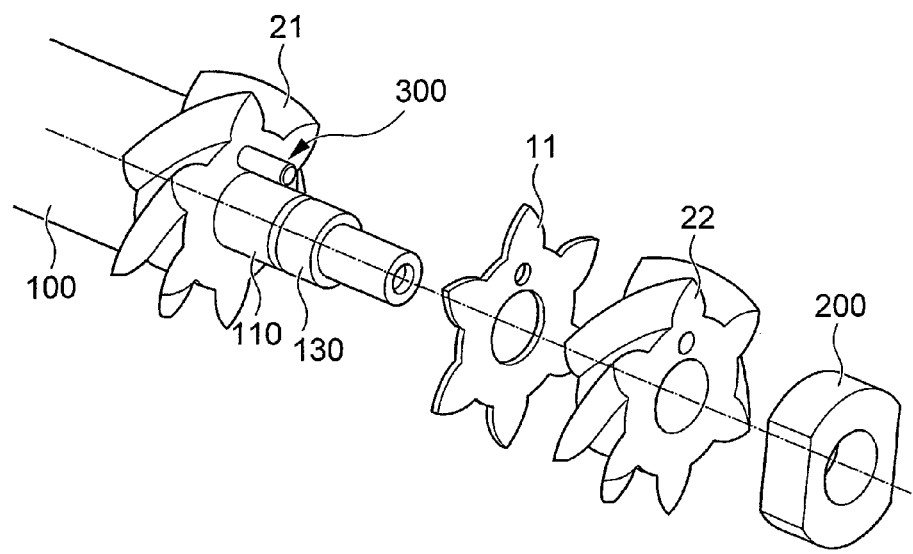
FIG. 16 is an exploded view of the cutter having a spur gear shape using auxiliary plates shown in FIG. 15.

Depending on parameters (various factors of elements) of a target pinion PG, a face width (thickness) of the cutting edge portion 11 of the cutter having a spur gear shape SC is so small that there is a possibility that a strength resistant to the gear cutting cannot be obtained. In particular, when the number of teeth is small and a helix angle is small, the thickness of the cutting edge portion 11 tends to be reduced. As one of the methods for compensating the disadvantage, there is a method in which opposed surfaces of the cutting edge portion 11 having a planar spur gear shape is sandwiched between auxiliary plates 21 and 22 so as to be fixed. FIGS. 15 and 16 show an appearance of a tool employing such an embodiment. Herein, each of the two auxiliary plates 21 and 22 has a helical gear shape.

As shown in FIG. 16, after a cutting edge portion having a planar spur gear shape as the cutting edge portion 11 has been manufactured, the cutting edge portion 11 is sandwiched between the two auxiliary plates 21 and 22 of a helical gear shape. A shaft portion 110 of a base metal 100 of a tool is inserted into the cutting edge portion 11 and the auxiliary plates 21 and 22 sandwiching the cutting edge portion 11, and a screw portion 130 is fastened by a nut 200. At this time, a phase positioning pin 300 fixes the three members, i.e., the planar spur 11 as the cutting edge portion 11 and the two auxiliary plates 21 and 22, at predetermined phases. The phase positioning pin 300 may be of any structure or type, as long as the phase positioning pin 300 can fix the phases of the planar spur 11 and the auxiliary plates 21 and 22, without any problems such as displacement of phases upon cutting.

In this manner, by sandwiching the cutting edge portion 11 between the auxiliary plates 21 and 22, even when the thickness of the cutting edge portion 11 is small, a sufficiently needed strength can be obtained upon cutting of a gear.

The auxiliary plates 21 and 22 may have any shape, as long as the auxiliary plates 21 and 22 do not come into contact with a gear to be cut upon cutting. However, the helical gear shape is advantageous in terms of design and manufacture.

Figure 17:
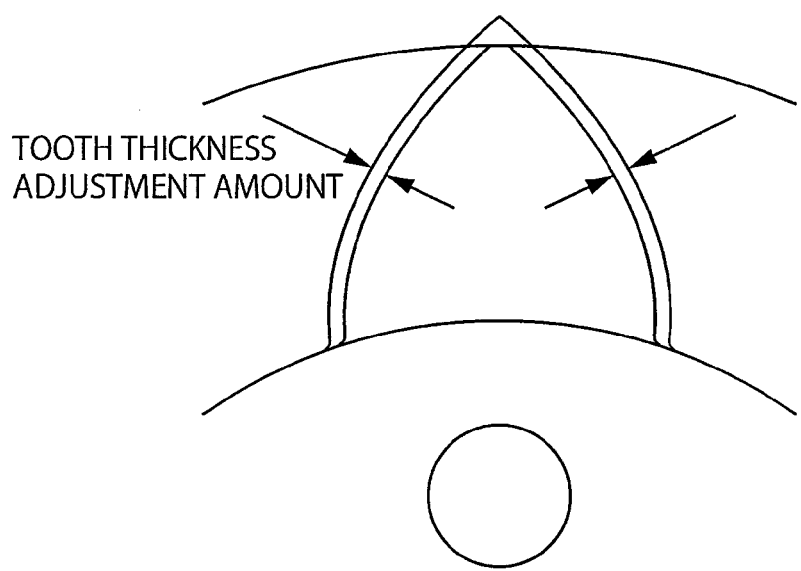
FIG. 17 is a view showing a tooth thickness adjustment amount of the auxiliary plate.

A tooth thickness of each of the auxiliary plates 21 and 22 of a helical gear shape should be decreased in advance by a predetermined amount, with respect to a parameter of a helical pinion gear PG to be meshed with a face gear FG to be cut. FIG. 17 shows such a tooth profile portion. It can be understood that the tooth thicknesses of the auxiliary plates 21 and 22 are smaller than that of the cutting edge portion 11. The decreased amount is referred to as tooth thickness adjustment amount. Due to the tooth thickness adjustment amount, the auxiliary plates 21 and 22 of a helical gear shape are recessed inward with respect to the tooth body of the helical pinion gear PG. As a result, unless a cutting amount exceeds an upper limit thereof, there is no possibility that the auxiliary plates 21 and 22 interfere with or come into contact with the tooth flank of the face gear FG.

Figure 18:
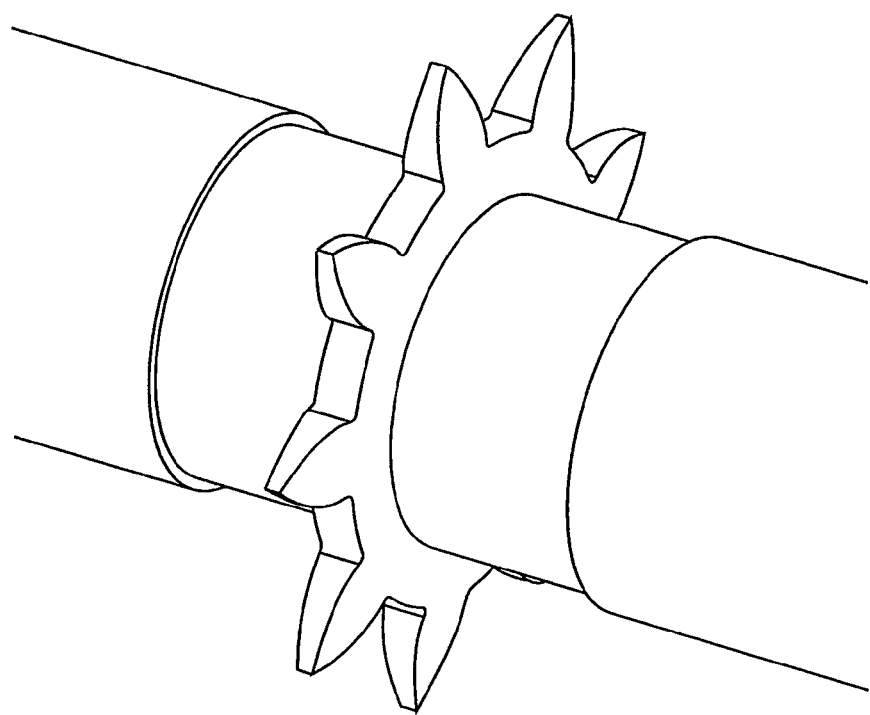
FIG. 18 is a view showing a cutter having a spur gear shape which is of a type where a cutting edge has a chevron angle.

As another design method for improving a strength of a cutter having a spur gear shape, there is described an embodiment in which a cutting edge of the cutter having a spur gear shape SC is provided with a chevron angle (see FIG. 18).

A face width (thickness) of the cutting edge portion 11 of a general cutter having a spur gear shape SC is determined by a tooth thickness of the pinion gear PG, a helix angle $\beta$ thereof and the number of teeth thereof. FIG. 19 shows a phase relationship between the face width (thickness) $b_{SC}$ of the cutting edge portion 11 and tooth profiles, when a tooth tip has a pointed shape (a maximum thickness), for example.

Namely, the shaded part of the tooth profile of FIG. 19 depicts the cross-section of the pinion gear PG by a plane perpendicular to an axis thereof, and an arc ab depicts a tooth thickness of the pinion gear PG in a cross-sectional view by a plane perpendicular to an axis thereof on a virtual outside diameter of the pinion gear PG. When an a point on the outside diameter is moved to a position of a c point along a tooth trace on an outside diameter of the pinion gear, a distance along which the c point is moved in the axial direction of the pinion gear is obtained by the following Expression 10.

$$Y = L \cdot \phi_S \quad \text{Expression 10:}$$

Herein, the following parameters are used.

Expression 11

$\alpha_n$; normal pressure angle of pinion $\beta$; helix angle of pinion $s_n$; normal tooth thickness of pinion $R_p$; radius of reference pitch circle of pinion and cutter $\left(= \dfrac{d_p}{2}\right)$ $\varphi_0$; tooth thickness angle of pinion $= \dfrac{s_n}{R_p \cdot \cos\beta}$ $\alpha_t$; pressure angle of pinion on plane perpendicular to axis $= \tan^{-1}\left(\dfrac{\tan\alpha_n}{\cos\beta}\right)$ $R_b$; radius of base circle of pinion and cutter $= R_p \cos\alpha_t \left(= \dfrac{d_b}{2}\right)$ $R_{aSC}$; radius of outside diameter circle of cutter $\left(= \dfrac{d_{aSC}}{2}\right)$ -continued $\alpha_{aSC}$; pressure angle on outside diameter of cutter $= \cos^{-1}\dfrac{R_b}{R_{aSC}}$ $S_{aSC}$; actual circular tooth thickness on outside diameter of cutter (when $S_{aSC} = 0$, tooth tip of cutter is pointed)

$\varphi_B$; phase angle $= \dfrac{\varphi_0}{2} + inv(\alpha_t) - inv(\alpha_{aSC}) - \dfrac{s_{aSC}}{2R_p}$ $L$; constant $= \pm \dfrac{R_p}{\tan\beta}$
when pinion is right hand helix, sign is +
when pinion is left hand helix, sign is −

$R_S$; radius of point S of cutter $\alpha_S$; pressure angle of point S of cutter on plane perpendicular to axis $= \cos^{-1}\dfrac{R_b}{R_S}$ $\tau_S$; development angle between point S and Y axis $inv(\ )$; involute function $\{inv(\alpha) = \tan\alpha - \alpha\}$ As shown in FIG. 19, the face width $b_{SC}$ of the general cutter having a spur gear shape SC is twice the above Expression.

$$b_{SC} = |2L \cdot \phi_S|$$

In the coordinates of FIG. 19, a given point on the left tooth flank of the cutter having a spur gear shape SC is given as follows.

Expression 13:

In XYZ coordinate system, when an origin is a center of the pinion, a Y axis is an axis of the pinion, and a Z axis is a center of the tooth thickness of the tooth profile of the pinion in a cross-sectional view by a plane perpendicular to an axis thereof, coordinates $(X_S, Y_S, Z_S)$ of a given point S of an edge of an acting cutting edge of a cutter having a standard spur gear shape not having a chevron angle are:

coordinates of the point S on the right tooth flank side $$\begin{cases} \tau_s = -\varphi_B + \dfrac{\varphi_0}{2} + inv(\alpha_t) - inv(\alpha_S) \\ X_S = R_S \sin\tau_S \\ Y_S = -L \cdot \varphi_B \\ Z_S = R_S \cos\tau_S \end{cases}$$

coordinates of the point S on the left tooth flank side $$\begin{cases} \tau_\varepsilon = \varphi_B - \dfrac{\varphi_0}{2} - inv(\alpha_t) + inv(\alpha_S) \\ X_S = R_S \sin\tau_S \\ Y_S = L \cdot \varphi_B \end{cases}$$

$$Z_S = R_S \cos\tau_S$$

Figure 20:
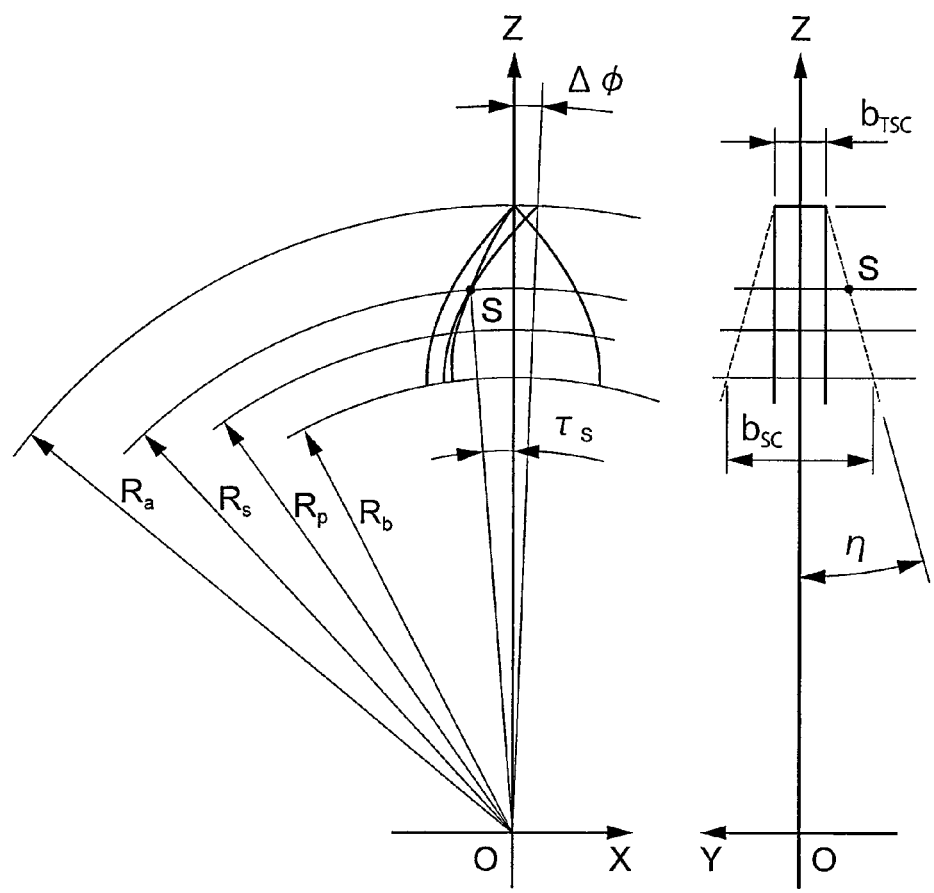
FIG. 20 is a view defining parameters relating to a tooth profile of the cutter having a spur gear shape of FIG. 18.
Figure 21:
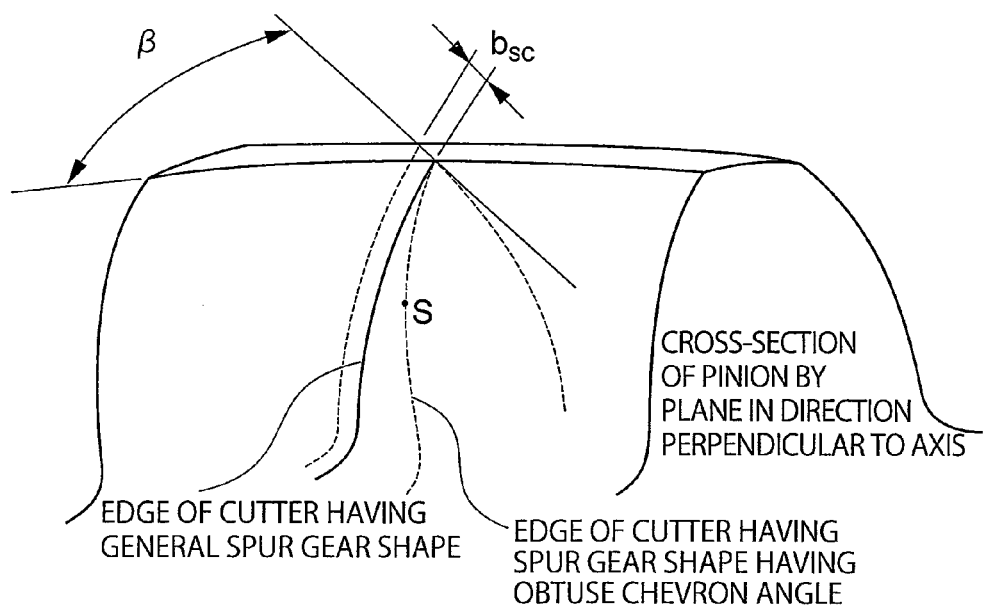
FIG. 21 is a view defining parameters relating to the tooth profile of the cutter having a spur gear shape of FIG. 18.

From the above coordinates, suppose that the cutting edge of the cutter having a spur gear shape SC, which has a face width (thickness) $b_{SC}$, is provided with a chevron angle in a direction where the cutting edge has a chevron shape seen in a cross-sectional view by a plane including an axis thereof, without changing the face width of the tooth tip of the cutter having a spur gear shape SC. As shown in FIGS. 20 and 21, when a chevron angle is represented as $\eta$, coordinates of a given point S on the left tooth flank of the cutter having a spur gear shape SC can be obtained by the following Expression 14.

$$\begin{cases} \eta; \text{chevron angle} \\ \Delta\varphi; \text{phase angle between cutting edge end} \\ \text{surface and point } S \text{ of a general tool of a} \\ \text{spur gear shape} \\ \Delta\varphi \text{ satisfies } f(\Delta\varphi) = (R_{aSC} - R_e \cos\tau_S)\tan\eta - \\ \frac{R_p}{\tan\beta} \cdot \Delta\varphi = 0 \end{cases} \quad \text{Expression 14}$$

Herein the following parameters are used.
Expression 15:

In XYZ coordinate system, when an origin is a center of the pinion, a Y axis is an axis of the pinion, and a Z axis is a center of the tooth thickness of the tooth profile of the pinion in a cross-sectional view by a plane perpendicular to an axis thereof, coordinates $(X_S, Y_S, Z_S)$ of a given point S of an edge of an acting cutting edge of a cutter having a spur gear shape having a chevron angle are:

coordinates of the point S on the right tooth flank side $$\begin{cases} \tau_S = -\varphi_B + \frac{\varphi_0}{2} + inv(\alpha_t) - inv(\alpha_S) - \Delta\varphi \\ X_S = R_S \sin\tau_S \\ Y_S = -L \cdot (\varphi_B + \Delta\varphi) \\ Z_S = R_S \cos\tau_s \end{cases}$$

coordinates of the point S on the left tooth flank side $$\begin{cases} \tau_S = \varphi_B - \frac{\varphi_0}{2} + inv(\alpha_t) - inv(\alpha_S) + \Delta\varphi \\ X_S = R_S \sin\tau_S \\ Y_S = L \cdot (\varphi_B + \Delta\varphi) \\ Z_S = R_S \cos\tau_s \end{cases}$$

The face width of the tooth tip of the cutter having a spur gear shape SC at this time is given by the following Expression 16.

$$b_{TSC} = b_{SC} = |2L\phi_S| \quad \text{Expression 16:}$$

On the other hand, the face width of the bottom of the cutter having a spur gear shape SC is given by the following Expression 17.

$$b_{SSC} = b_{TSC} + 2(R_\alpha - R_f)\tan\eta \quad \text{Expression 17:}$$

Herein, $R_f$ represents a root radius of the pinion.

Figure 22:
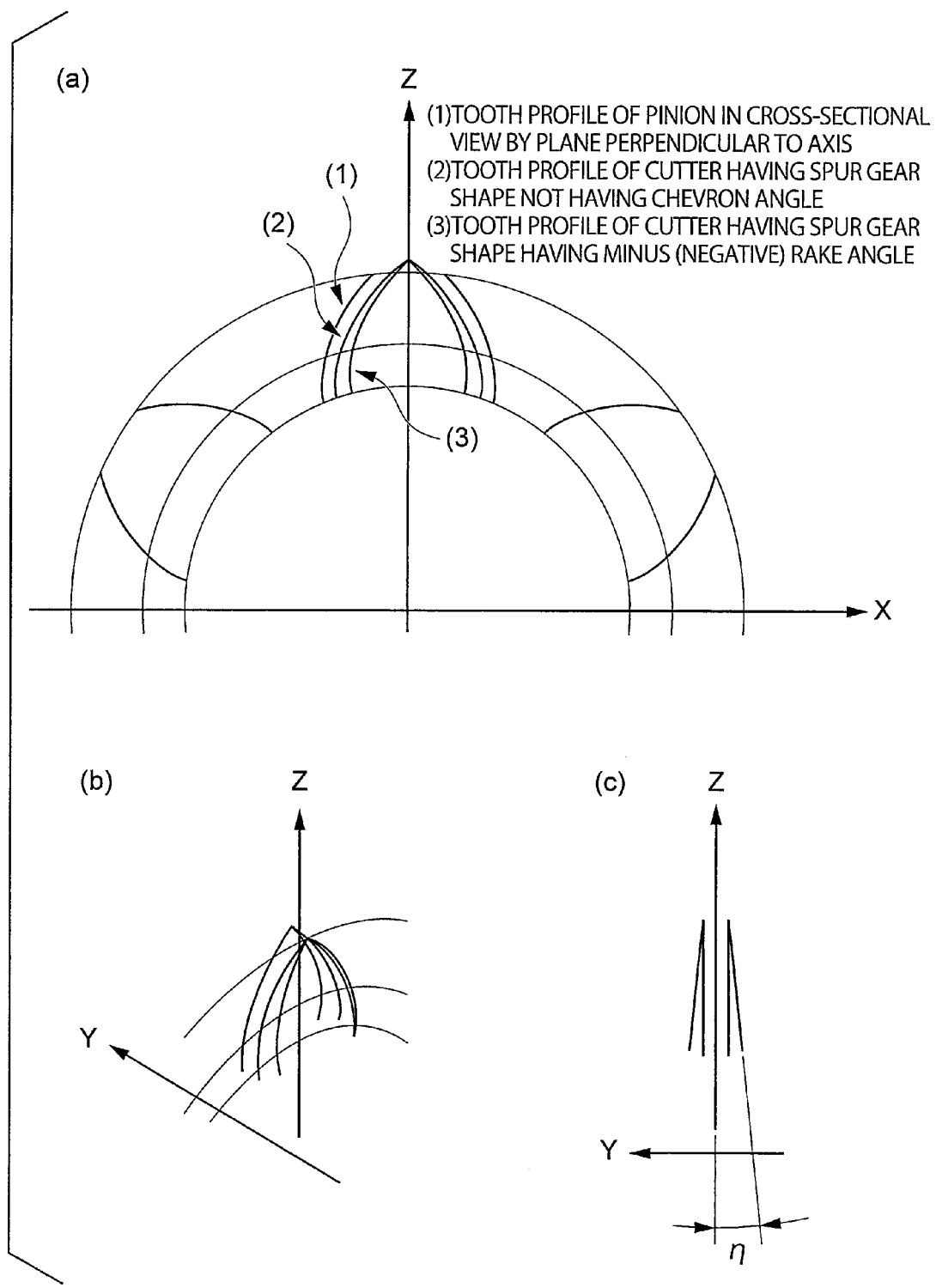
FIG. 22 is views showing a tooth profile of a cutter having a spur gear shape with an obtuse angle calculated by an actually created program.

FIG. 22 shows a tooth profile of the cutter having a spur gear shape SC with a chevron angle, which was calculated by an actually created program. Parameters (various factors of elements) of the pinion gear PG used in this calculation were mn=0.85, z=6, α=20°, β=55°, Sn=1.583, and η=6°. At this time, the face width (thickness) of the tooth tip was 0.365, while the face width (thickness) of the bottom was 0.767. The cutting edge has such a chevron shape that the thickness of the bottom side is about twice greater than that of the tooth tip. Thus, the strength of the cutting edge can be apparently improved, the life span of the cutter can be elongated, and the machining efficiency can be enhanced.

As understood from FIG. 22, as compared with a general tooth profile (2), a tooth profile (3) with a chevron angle is a free profile which tends to have a smaller pressure angle. The chevron shape of the chevron angle is not limited to a linear shape but may be a curvilinear shape. When there is an advantage in terms of precision of a tool, manufacturing efficiency upon gear cutting of a face gear and precision of the face gear, the chevron shape of the chevron angle may be curvilinear.

Figure 23:
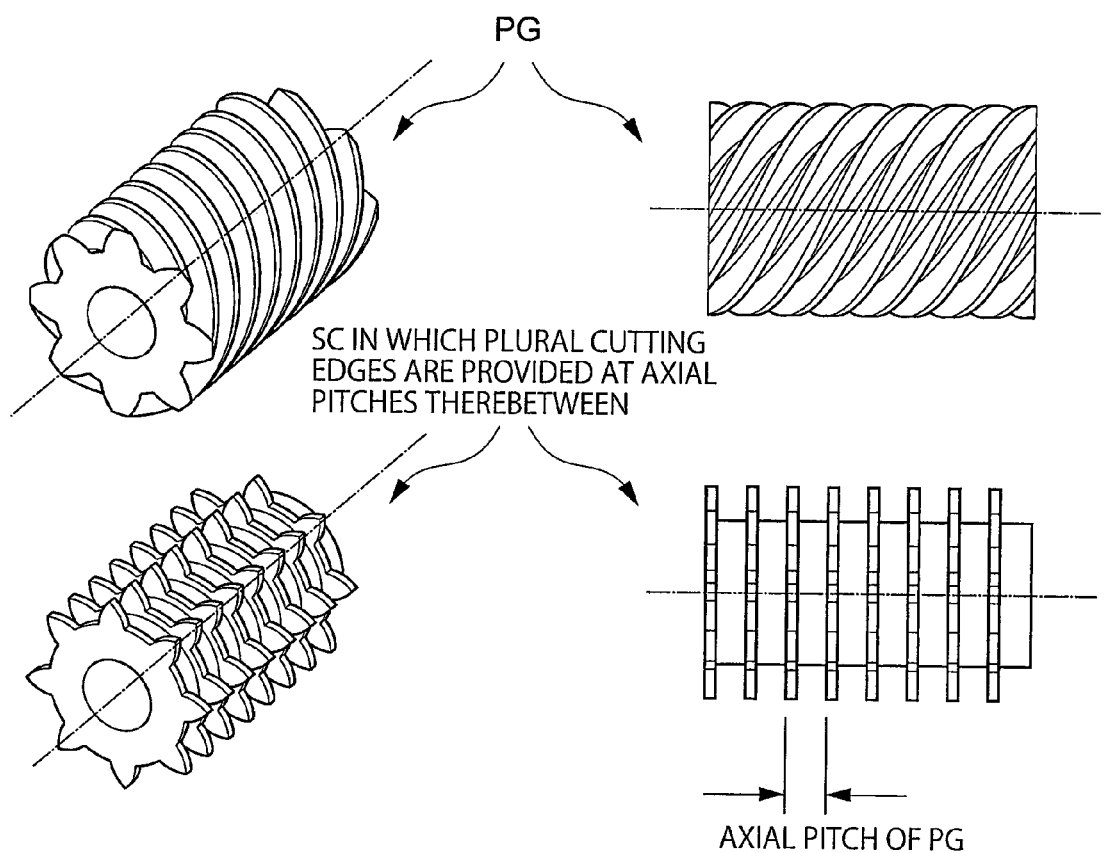
FIG. 23 is views showing an example in which a plurality of cutting edge portions are provided in the same phase at equal axial pitches therebetween.
Figure 24:
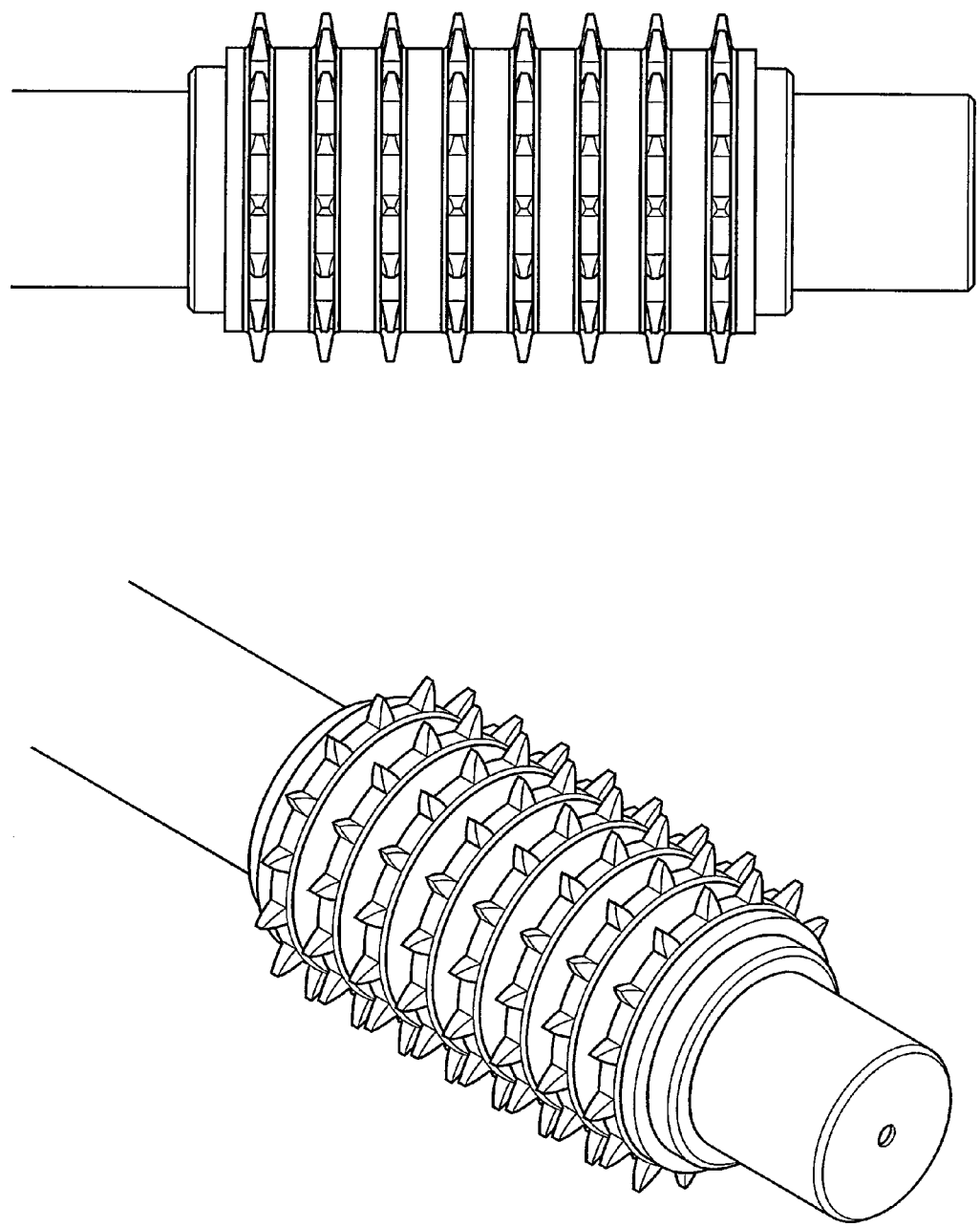
FIG. 24 is views showing an example in which a plurality of cutting edge portions are provided in the same phase at equal axial pitches therebetween, in combination with a cutter having a spur gear shape with a chevron angle.

Next, there are described application examples in which the plurality of cutting edge portions 11 are axially provided. In an example of FIG. 23, the plurality of cutting edge portions 11 are provided at axially equal pitches therebetween with the same phase. In this case, since cutting can be simultaneously performed on a plurality of positions, a cutting load can be distributed. In addition, since the axial feeding length of the tool is small (the tool is fed only by the axial pitch), the machining efficiency is excellent. Thus, this example is advantageous particularly when a face gear is cut to have a wide face width. If the cutting edge portion is so thin that a strength thereof is uncertain, the aforementioned cutter having a spur gear shape with a chevron angle may be combined. Such an example is shown in FIG. 24.

Figure 25:
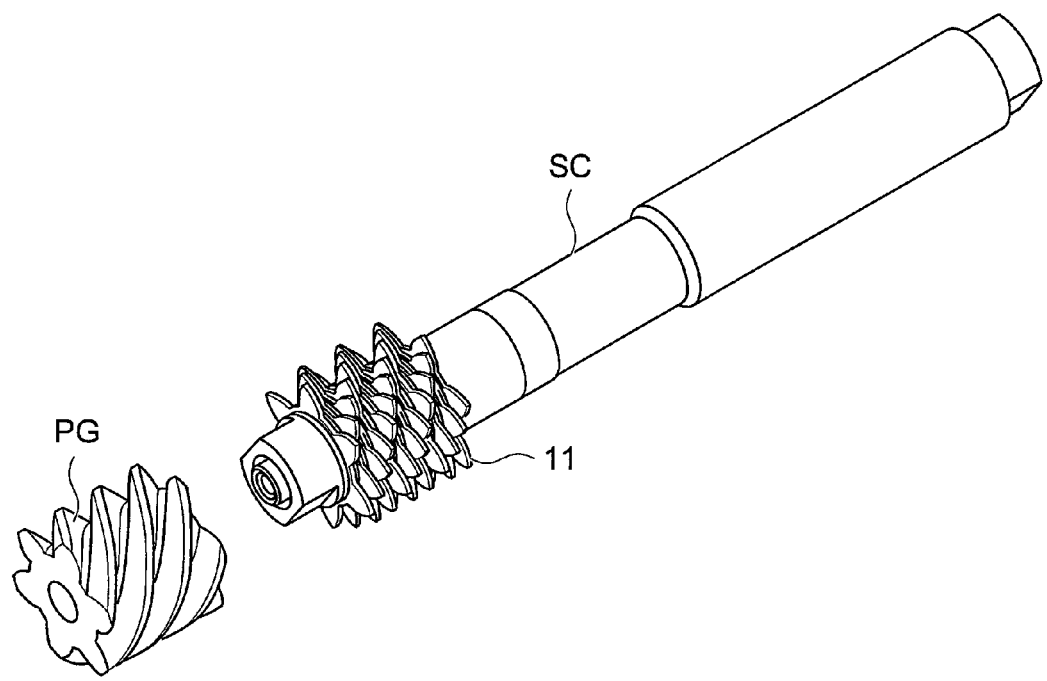
FIG. 25 is a view showing an example in which a plurality of cutting edge portions are provided with their phases being equally displaced.
Figure 26:
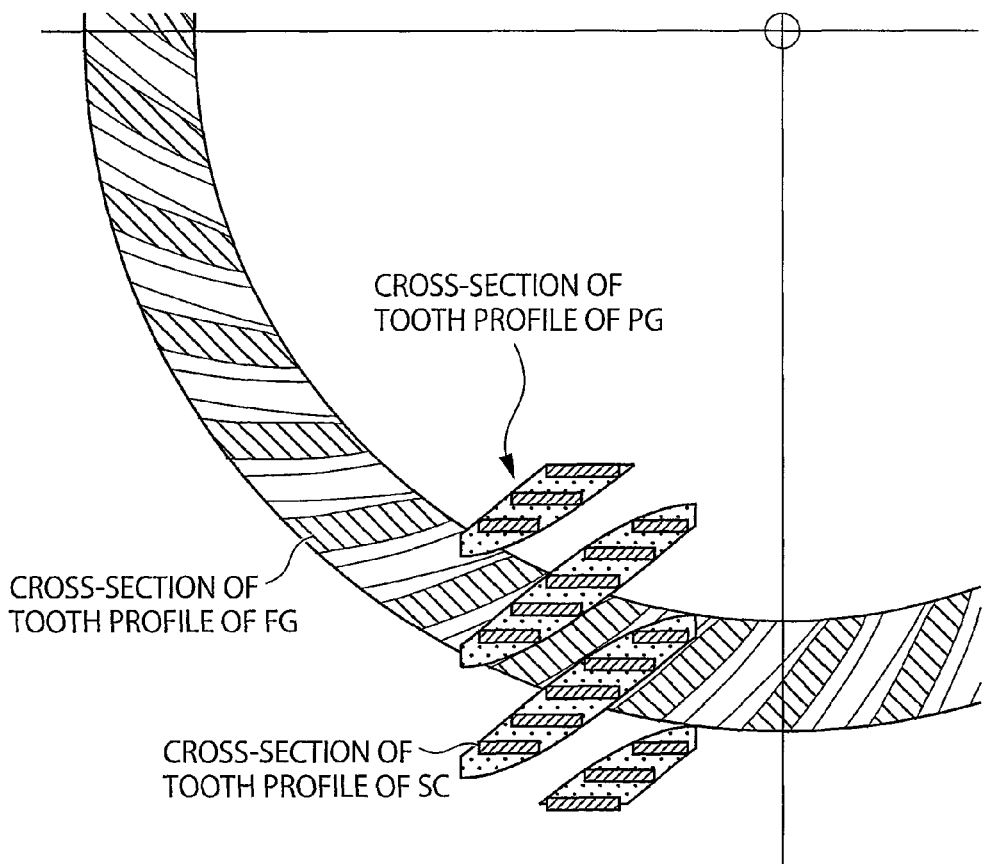
FIG. 26 is a view showing a positional relationship between the cutting edge of a cutter having a spur gear shape and the tooth profile of a face gear (or a pinion gear)

Next, there is described another application example in which the plurality of cutting edge portions 11 are axially provided. In an example of FIG. 25, the plurality of cutting edge portions 11 are provided with their phases being equally displaced from each other, in accordance with a tooth trace shape by a helix angle β of the helical pinion gear PG. In this case, as understood from FIG. 26, the machining efficiency upon gear cutting of the face gear FG can be significantly improved.

Figure 27:
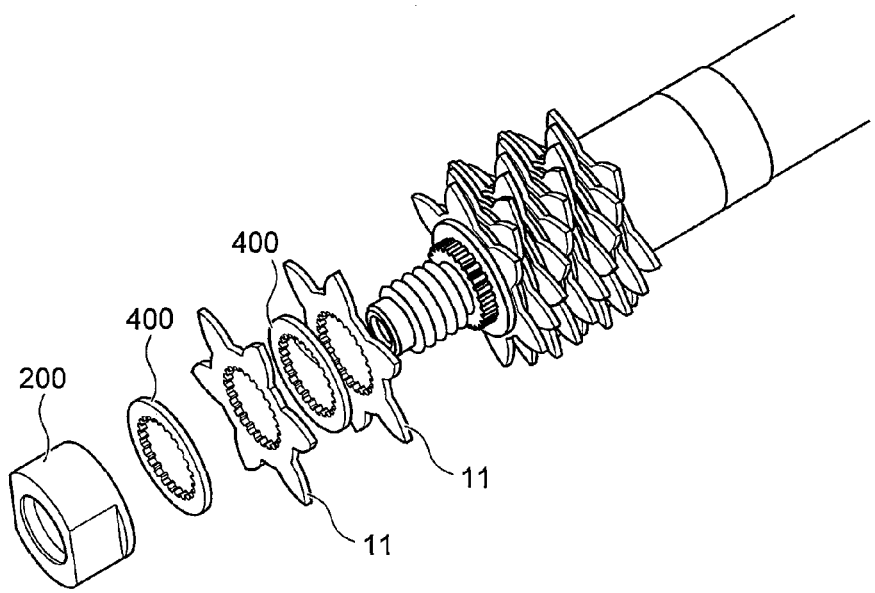
FIG. 27 is an exploded view of the cutter having a spur gear shape of FIG. 25.

To be more specific, as shown in FIG. 27, for example, a plurality of planar cutters having a spur gear shape (cutting edge portions 11) having a female spline shape are inserted to a shaft having a male spline shape or a serration shape. At this time, the plurality of planar cutters (planar spur gears) are assembled such that phases of teeth of the splines are continuously, equally displaced from each other. Thus, a positioning equivalent to the tooth trace shape by the helix angle β of the pinion gear PG is achieved. A spacer for adjusting an axial pitch 400 functions as an adjusting plate for positioning the respective spur gears correspondingly to the helix angle β. A screw disposed on the shaft is fastened by a nut 200.

In this embodiment, an axial pitch of the cutters can be freely set by the thickness of the adjusting spacer and the number of teeth of the splines. Thus, a larger number of the cutting edges can be located in the face width direction (axial direction), whereby the machining efficiency can be significantly improved.

Figure 28:
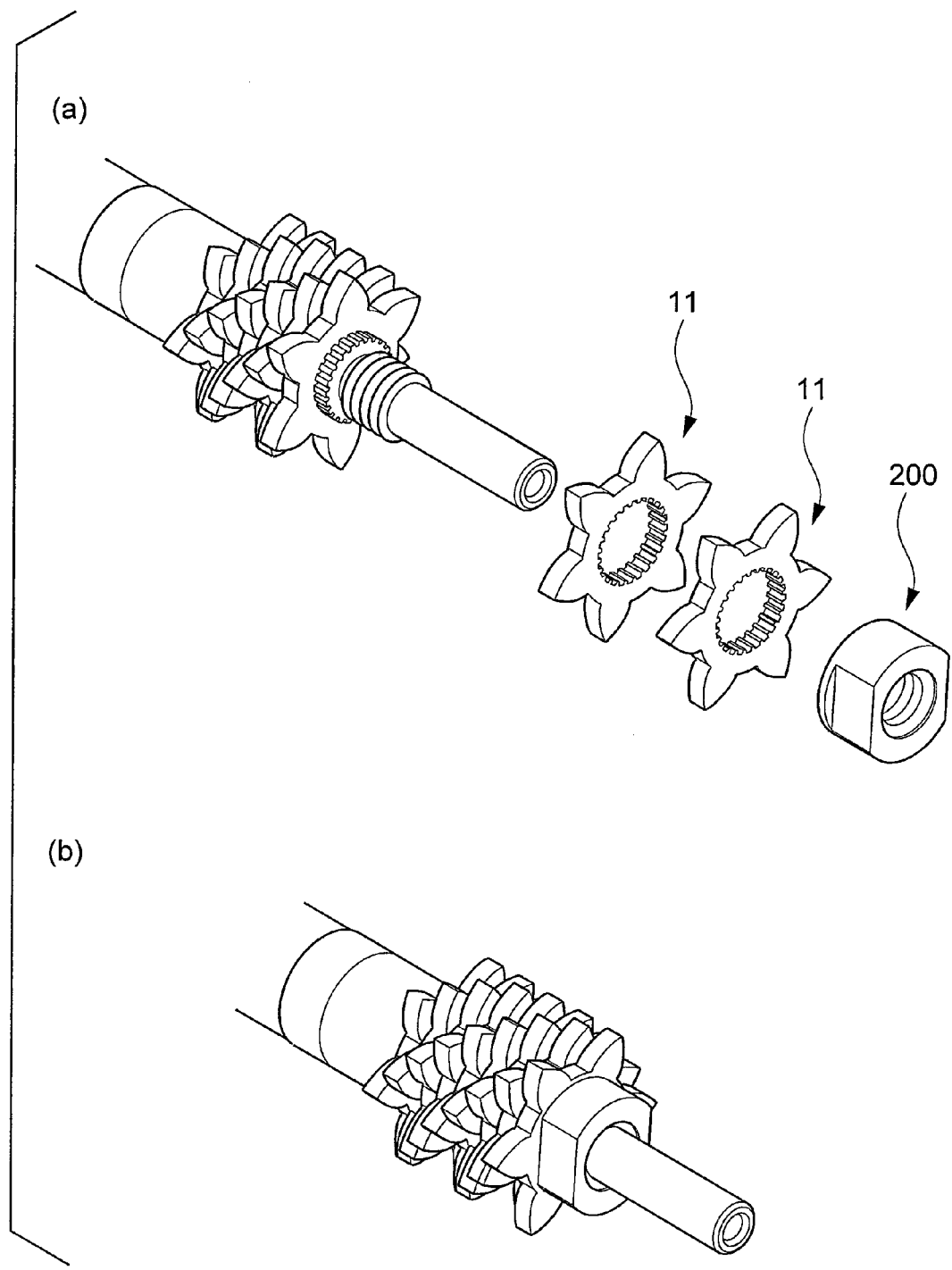
FIG. 28 is views showing a modification (contact assembly type) of the cutter having a spur gear shape of FIG. 25.

FIG. 28 shows an example in which no adjusting spacer is used. A helix angle β is determined by a thickness of the cutting edge portion. It is necessary to make the thickness of the cutting edge portion conform to a design value when manufactured. However, since the cutting edge portions are adjacent to each other, the strength can be improved.

Figure 29:
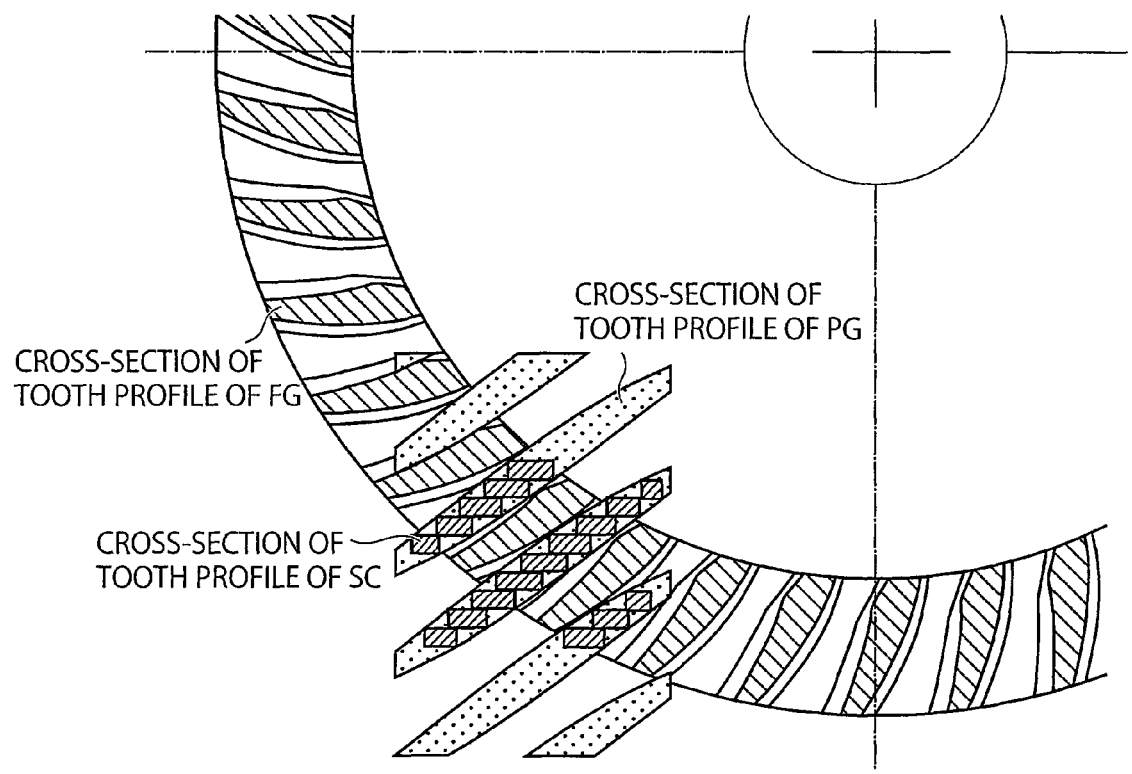
FIG. 29 is views showing a positional relationship between a cutter having a spur gear shape and a face gear when the face gear is cut, and a positional relationship between the face gear and a pinion to be meshed with the face gear, in a cross-section of the face gear by a plane perpendicular to an axis thereof.

FIG. 29 shows a positional relationship between the cutter having a spur gear shape SC and the face gear FG upon cutting of the face gear, and a positional relationship between the cutter having a spur gear shape SC and the pinion PG to be meshed with the face gear FG in the cross-section of the face gear FG by a plane perpendicular to an axis thereof.

Figure 30:
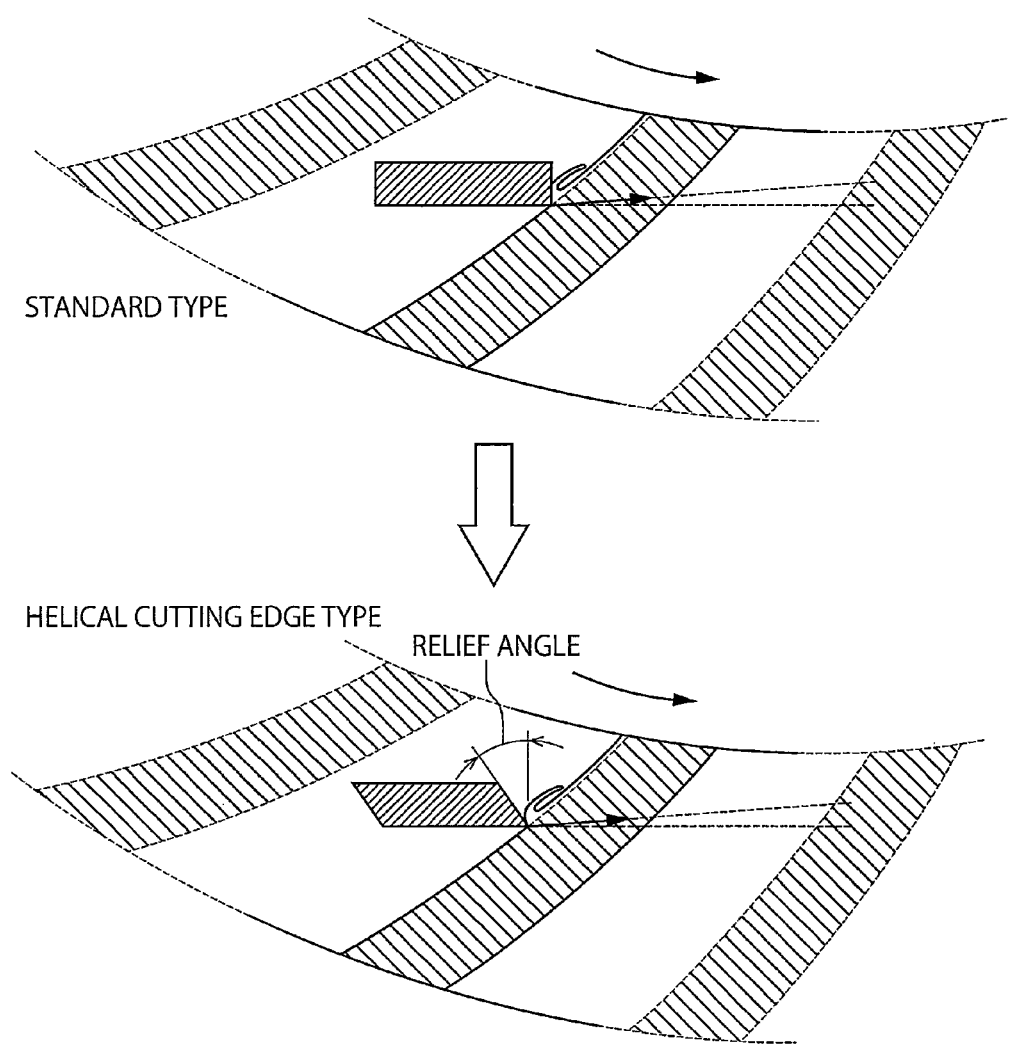
FIG. 30 is a view for explaining a case in which a side surface of a tooth tip of the cutting edge portion is provided with a predetermined clearance (relief) angle.
Figure 32:
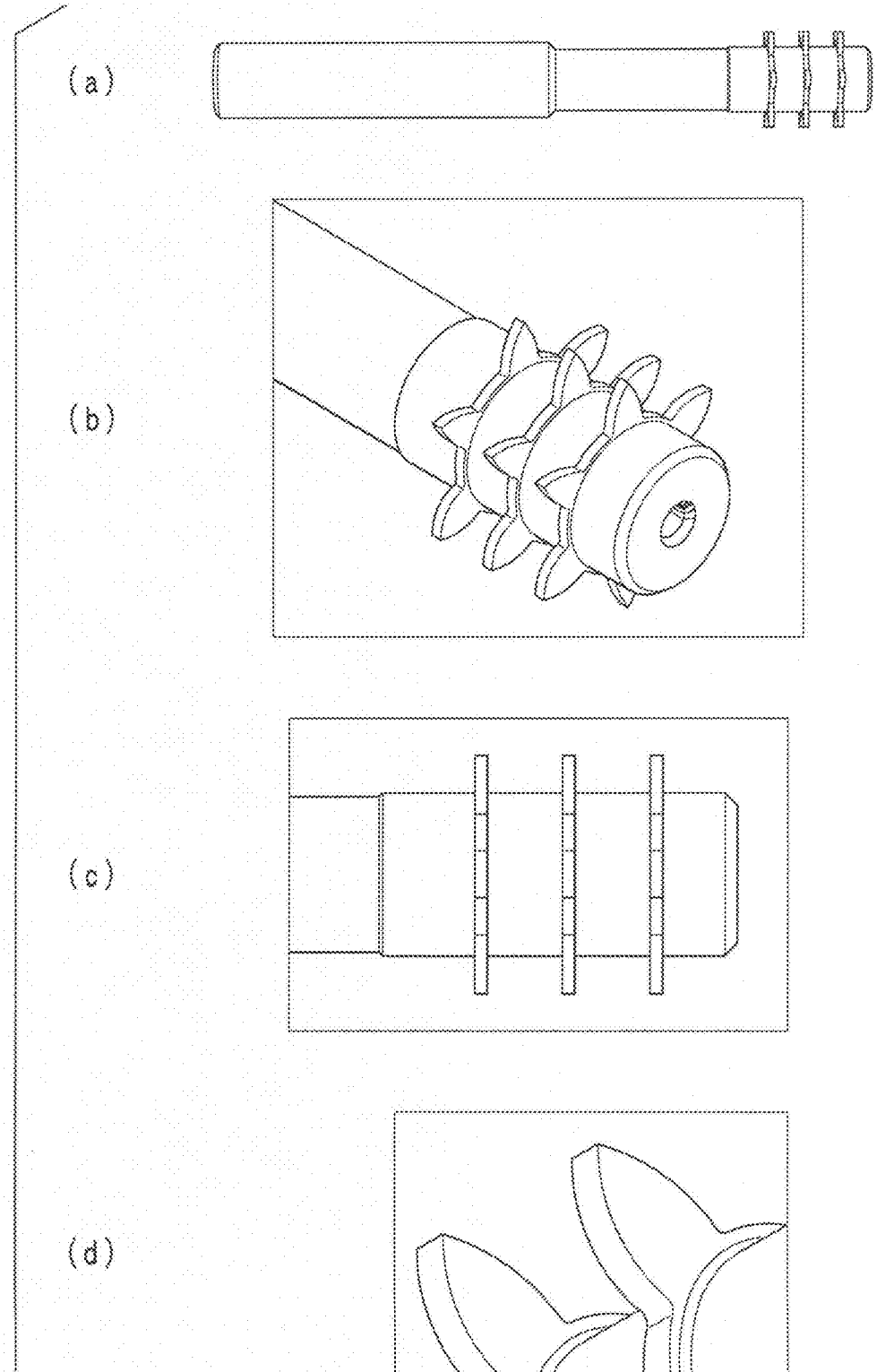
FIG. 32 is views showing appearance of the actually manufactured tool.

As shown in FIG. 30, it is effective that a side surface of the tooth tip of the cutting edge portion 11 is provided with a predetermined clearance angle. At this time, such a cutting edge portion 11 can be manufactured by providing a helix angle corresponding to a desired clearance angle to the cutter having a spur gear shape SC, without changing the tooth profile of the cutter having a spur gear shape SC in a cross-sectional view by a plane perpendicular to an axis thereof. Although a standard tooth profile of the cutter having a spur gear shape SC is a spur gear, the face gear FG is cut by a helical gear having a helix angle opposite to that of the helical pinion gear PG, in order to improve the machinability.

FIG. 31 shows respective parameters relating to an actually manufactured tool. In addition, FIGS. 32(a) to 32(d) show appearance of the actually manufactured tool. Due to such a tool, a face gear to be meshed with a helical gear can be efficiently cut in a theoretically right manner.

What is claimed is:

1. A tool having a spur gear shape for cutting, as a gear to be cut, a skew gear to be meshed with a predetermined helical gear, the tool comprising a cutting edge portion having a cutting edge of a tooth-profile curvilinear shape that is the same as one of at least a pair of tooth-profile curvilinear shapes of a tooth profile of the helical gear in a cross-sectional view by a plane perpendicular to an axis of the helical gear, wherein:

a circular tooth thickness of the cutting edge portion is smaller than a circular tooth thickness of the tooth profile of the helical gear in a cross-sectional view by a plane perpendicular to the axis;

a tooth depth of the cutting edge portion is larger than a tooth depth of the helical gear; and when a circular tooth thickness of a tooth tip of the cutting edge portion is represented as $S_{atSC}$, a circular tooth thickness on a virtual outside diameter of the tooth profile of the helical gear in a cross-sectional view by a plane perpendicular to the axis is represented as $S_{at}$, a helix angle on the virtual outside diameter of the tooth profile of the helical gear in a cross-sectional view by a plane perpendicular to the axis is represented as $\beta_a$, and a face width of the cutting edge portion is represented as $b_{SC}$, the following Expression 1 is satisfied $$b_{SC} \leq \frac{S_{at} - S_{atSC}}{\tan\beta_a}. \qquad \text{Expression 1}$$

2. The tool according to claim 1, wherein correspondingly to each pair of tooth-profile curvilinear shapes of the tooth profile of the helical gear in a cross-sectional view by a plane perpendicular to the axis, the cutting edge portion has cutting edges of a tooth-profile curvilinear shape on a right side and a left side.

3. The tool according to claim 1, wherein the helical gear is an involute cylindrical gear.

4. The tool according to claim 3, wherein the gear to be cut is a face gear.

5. The tool according to claim 1, further comprising two auxiliary plates provided to sandwich therebetween the cutting edge portion.

6. The tool according to claim 5, wherein each of the two auxiliary plates has a helical gear shape.

7. A tool having a spur gear shape for cutting, as a gear to be cut, a skew gear to be meshed with a predetermined helical gear, the tool comprising a cutting edge portion having at least one cutting edge having a tooth-profile curvilinear shape, wherein:

a circular tooth thickness of the cutting edge portion is smaller than a circular tooth thickness of a tooth profile of the helical gear in a cross-sectional view by a plane perpendicular to an axis of the helical gear;

a tooth depth of the cutting edge portion is larger than a tooth depth of the helical gear; and a face width of the cutting edge portion has an angle which causes a cutting edge to have a chevron shape in a cross-sectional view by a plane including the axis, when a given point on an edge of a cutting edge having a tooth-profile curvilinear shape of a tool having a standard spur gear shape not having a chevron angle is represented as Expression 3, Expression 3:

In XYZ coordinate system, when an origin is a center of a pinion, a Y axis is an axis of the pinion, and a Z axis is a center of tooth thickness of a tooth profile of the pinion in a cross-sectional view by a plane perpendicular to an axis of the pinion, coordinates $(X_S, Y_S, Z_S)$ of a given point S of an edge of an acting cutting edge of a cutter having a standard spur gear shape not having a chevron angle are:

coordinates of the point S on a right tooth flank side $$\begin{cases} \tau_S = -\varphi_B + \dfrac{\varphi_0}{2} + inv(\alpha_t) - inv(\alpha_S) \\ X_S = R_S \sin\tau_S \\ Y_S = -L \cdot \varphi_B \\ Z_S = R_S \cos\tau_S \end{cases}$$

coordinates of the point S on a left tooth flank side $$\begin{cases} \tau_S = \varphi_B - \dfrac{\varphi_0}{2} - inv(\alpha_t) + inv(\alpha_S) \\ X_S = R_S \sin\tau_S \\ Y_S = L \cdot \varphi_B \\ Z_S = R_S \cos\tau_S \end{cases}$$

with the use of parameters of Expression 2,

Expression 2

| | |
|---|---|
| $\alpha_n$; | normal pressure angle of pinion |
| $\beta$; | helix angle of pinion |
| $s_n$; | normal tooth thickness of pinion |
| $R_p$; | radius of reference pitch circle of pinion and cutter $\left(=\dfrac{d_p}{2}\right)$ |
| $\varphi_0$; | tooth thickness angle of pinion $= \dfrac{s_n}{R_p \cdot \cos\beta}$ |
| $\alpha_t$; | pressure angle of pinion on plane perpendicular to axis $= \tan^{-1}\left(\dfrac{\tan\alpha_n}{\cos\beta}\right)$ |
| $R_b$; | radius of base circle of pinion and cutter $= R_p \cos\alpha_t \left(=\dfrac{d_b}{2}\right)$ |
| $R_{aSC}$; | radius of outside diameter circle of cutter $\left(=\dfrac{d_{aSC}}{2}\right)$ |

-continued $\alpha_{aSC}$; pressure angle on outside diameter of cutter $= \cos^{-1} \dfrac{R_b}{R_{aSC}}$ $S_{atSC}$; actual circular tooth thickness on outside diameter of cutter (when $S_{atSC} = 0$, tooth tip of cutter is pointed)

$\varphi_B$; phase angle $= \dfrac{\varphi_0}{2} + inv(\alpha_t) - inv(\alpha_{aSC}) - \dfrac{S_{atSC}}{2R_p}$ $L$; constant $= \pm \dfrac{R_p}{\tan\beta}$, when pinion is right hand helix, sign is + when pinion is left hand helix, sign is −

$R_S$; radius of point S of cutter $\alpha_S$; pressure angle of point S of cutter on plane perpendicular to axis $= \cos^{-1} \dfrac{R_b}{R_S}$ $\tau_S$; development angle between point S and Y axis $inv(\ )$; involute function $\{inv(\alpha) = \tan\alpha - \alpha\}$ the tooth-profile curvilinear shape of the cutting edge portion has a chevron angle that satisfies Expression 5, Expression 5:

In XYZ coordinate system, when an origin is a center of a pinion, a Y axis is an axis of the pinion, and a Z axis is a center of tooth thickness of a tooth profile of the pinion in a cross-sectional view by a plane perpendicular to an axis of the pinion, coordinates $(X_S, Y_S, Z_S)$ of a given point S of an edge of an acting cutting edge of a cutter having a spur gear shape having a chevron angle are:

coordinates of the point S on a right tooth flank side $$\begin{cases} \tau_S = -\varphi_B + \dfrac{\varphi_0}{2} + inv(\alpha_t) - inv(\alpha_S) - \Delta\varphi \\ X_S = R_S \sin\tau_S \\ Y_S = -L \cdot (\varphi_B + \Delta\varphi) \\ Z_S = R_S \cos\tau_s \end{cases}$$

coordinates of the point S on a left tooth flank side $$\begin{cases} \tau_s = \varphi_B - \dfrac{\varphi_0}{2} + inv(\alpha_t) - inv(\alpha_S) + \Delta\varphi \\ X_S = R_S \sin\tau_S \\ Y_S = L \cdot (\varphi_B + \Delta\varphi) \\ Z_S = R_S \cos\tau_s \end{cases}$$

with the use of parameters of Expression 4,

Expression 4

$$\begin{pmatrix} \eta; & \text{chevron angle} \\ \Delta\varphi; & \text{phase angle between cutting edge end surface and} \\ & \text{point } S \text{ of a general tool having a spur gear} \\ & \text{shape } \Delta\varphi \text{ satisfies } f(\Delta\varphi) = (R_{aSC} - R_s \cos\tau_S) \\ & \tan\eta - \dfrac{R_p}{\tan\beta} \cdot \Delta\varphi = 0 \end{pmatrix}$$

8. The tool according to claim 1, wherein
a plurality of the cutting edge portions are axially provided.

9. The tool according to claim 8, wherein
the plurality of cutting edge portions are provided at equal pitches therebetween with the same phase as each other.

10. The tool according to claim 8, wherein
the plurality of cutting edge portions are provided with their phases being equally displaced from each other, in accordance with a tooth trace shape by the helix angle of the helical gear.

11. The tool according to claim 1, wherein
a side surface of the tooth tip of the cutting edge portion is provided with a predetermined relief angle.

12. A method for cutting, as a gear to be cut, a skew gear to be meshed with a predetermined helical gear, with the use of the tool according to claim 1.

13. A tool having a spur gear shape for cutting, as a gear to be cut, a skew gear to be meshed with a predetermined helical gear, the tool comprising:
a cutting edge portion having at least one cutting edge having a tooth-profile curvilinear shape, wherein:
a circular tooth thickness of the cutting edge portion is smaller than a circular tooth thickness of a tooth profile of the helical gear in a cross-sectional view by a plane perpendicular to an axis of the helical gear;
a tooth depth of the cutting edge portion is larger than a tooth depth of the helical gear; and
a face width of the cutting edge portion has an angle which causes a cutting edge to have a chevron shape in a cross-sectional view by a plane including the axis; and
the tool having a spur gear shape is configured to cut the skew gear which is configured to mesh with the helical gear.

* * * * *